US006141010A

United States Patent [19]
Hoyle

[11] Patent Number: 6,141,010
[45] Date of Patent: Oct. 31, 2000

[54] COMPUTER INTERFACE METHOD AND APPARATUS WITH TARGETED ADVERTISING

[75] Inventor: Martin David Hoyle, Destrehan, La.

[73] Assignee: B. E. Technology, LLC, Bay City, Mich.

[21] Appl. No.: 09/118,351

[22] Filed: Jul. 17, 1998

[51] Int. Cl.⁷ ..................................................... G06F 3/00
[52] U.S. Cl. ......................... 345/356; 345/348; 345/357; 707/501
[58] Field of Search .................................... 707/501, 514; 345/339, 340, 341, 348, 349, 356, 357

[56] References Cited

U.S. PATENT DOCUMENTS

| | | |
|---|---|---|
| 4,602,279 | 7/1986 | Freeman . |
| 5,347,632 | 9/1994 | Filepp et al. . |
| 5,572,643 | 11/1996 | Judson . |
| 5,584,025 | 12/1996 | Keithley et al. . |
| 5,600,781 | 2/1997 | Root et al. . |
| 5,617,565 | 4/1997 | Augenbrauun et al. . |
| 5,710,884 | 1/1998 | Dedrick . |
| 5,717,923 | 2/1998 | Dedrick . |
| 5,724,521 | 3/1998 | Dedrick . |
| 5,732,218 | 3/1998 | Bland et al. . |
| 5,740,549 | 4/1998 | Reilly et al. ............................... 705/14 |
| 5,848,397 | 12/1998 | Marsh et al. ............................... 705/14 |
| 5,890,172 | 3/1999 | Borman et al. .......................... 707/501 |
| 5,914,714 | 6/1999 | Brown ...................................... 345/339 |
| 5,917,491 | 6/1999 | Bauersfeld .............................. 345/352 |
| 5,933,811 | 8/1999 | Angles et al. ............................. 705/14 |
| 5,937,392 | 8/1999 | Alberts ...................................... 705/14 |
| 5,948,061 | 9/1999 | Merriman et al. ...................... 707/501 |
| 5,963,208 | 10/1999 | Dolon et al. ............................. 345/357 |
| 5,977,970 | 11/1999 | Amro et al. ............................. 345/340 |

OTHER PUBLICATIONS

Brown, M, Using Netscape 3, special Edition p. 40, 43, 52, 53, 58, 59, 62–64, 94–109, 1996.

*Primary Examiner*—Raymond J. Bayerl
*Assistant Examiner*—Cao H Nguyen
*Attorney, Agent, or Firm*—Reising, Ethington, Barnes, Kisselle, Learman & McCulloch, P.C.

[57] ABSTRACT

A method and apparatus for providing an automatically upgradeable software application that includes targeted advertising based upon demographics and user interaction with the computer. The software application is a graphical user interface that includes a display region used for banner advertising that is downloaded from time to time over a network such as the Internet. The software application is accessible from a server via the Internet and demographic information on the user is acquired by the server and used for determining what banner advertising will be sent to the user. The software application further targets the advertisements in response to normal user interaction, or use, of the computer. Associated with each banner advertisement is a set of data that is used by the software application in determining when a particular banner is to be displayed. This includes the specification of certain programs that the user may have so that, when the user runs the program (such as a spreadsheet program), an advertisement will be displayed that is relevant to that program (such as an advertisement for a stock brokerage). This provides two-tiered, real-time targeting of advertising—both demographically and reactively. The software application includes programming that accesses the server on occasion to determine if one or more components of the application need upgrading to a newer version. If so, the components are downloaded and installed without requiring any input or action by the user.

22 Claims, 14 Drawing Sheets

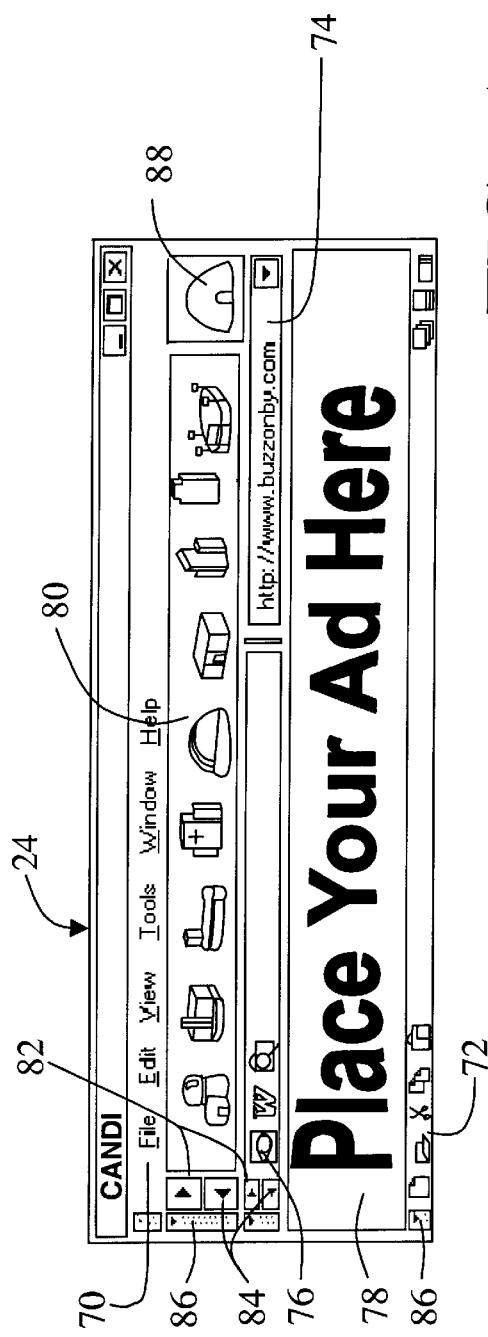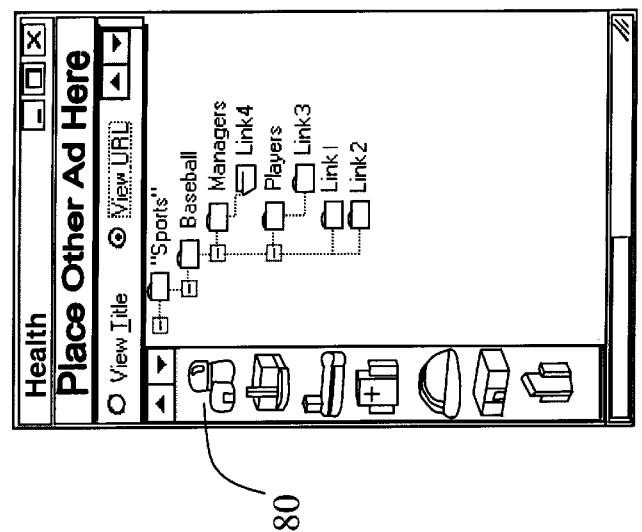
FIG. 5
FIG. 5a

| Image File | Destination Link | Associated Categories | Associated Links | Associated Programs | Priority Level |
|---|---|---|---|---|---|
| Banner01.gif | www.first_link.com | business, finance | www.microsoft.com\excel www.lotus.com\123 | Excel™, 123™ | General |
| Banner02.gif | www.second_link.com \ products | business, shopping, computers | | Control Panel:System | High |
| Banner03.gif | third_link.com | sports | www.nfl.com www.espn.com www.sports.com | | Medium |
| .. | .. | .. | .. | .. | .. |
| BannerXX.gif | www.last_link.com\cgi\login | travel, entertainment | | | High |

FIG. 7

COMPUTER INTERFACE METHOD AND APPARATUS WITH TARGETED ADVERTISING

TECHNICAL FIELD

This invention relates in general to user interfaces for accessing computer applications and information resources and, in particular, to user interfaces that provide advertising obtained over a global computer network such as the Internet.

BACKGROUND OF THE INVENTION

The continuing expansion of the Internet and other private and semi-private networks has led to the now widespread practice of electronic distribution of software to end users, whether as freeware, shareware, or fully paid-up licensed software. Traditionally, freeware programs have generally been small, unsupported single-purpose programs that are of limited use. Since no income was derived from these programs, there was little incentive for the creators of this type of software to undertake major development efforts. More recently, however, a new type of free software has emerged which, while free to end users, does provide income to the creator of the software via advertising incorporated into the software. This is of benefit both to the end user and advertiser, as the end user obtains useful software at no cost and the advertiser gets advertising exposure for its products or services. One well known example of this type of arrangement is in push technology products, such as Pointcast™, which permits a user to receive and display broadcasted information over the Internet. Using this software, new advertising is periodically received along with various requested types of news information (e.g., financial, business, sports) and is stored locally on the user's computer for later retrieval and display by the program.

The new advertising medium provided by the Internet has a number of significant advantages for advertisers. First, the users of the software within which the advertising is placed have, on average, much more disposable income to spend on products and services than the average user of other traditional advertising media, such as television or print. Second, the advertising can, in some instances, be targeted in various ways, such as demographically or reactively. An example of the latter of these is in push technology where the user requests certain types of information and this request is used to select the type of advertisement sent to the user along with the requested content. Third, the advertising can not only include audio and video elements as well as simple visual elements, but can also be interactive. For example, by clicking on the advertisement, the user can be provided with additional information about the advertised products or services and can even be given the opportunity to purchase the products or services electronically.

One of the most common methods of advertising via the Internet is through the use of links (e.g., URLs) embedded within web pages. By using embedded links, the advertisements need not be located on the same server as the web pages themselves. When the web page is loaded or reloaded, the advertising server is accessed to obtain a new advertisement which is incorporated into the web page displayed on the user's screen. These advertisements are simple graphical images (such as animated gifs) that are retrieved from the advertising server along with an associated link to additional information about the advertised product or service. While this permits new advertising to be displayed each time a web page is loaded or refreshed, and while this allows geographically unlimited advertising, it at most permits targeting of the advertisement based upon the type of information contained in the web page. Moreover, access to a new advertisement is only available during the period of time that the client computer is connected to the Internet.

Currently-available computer programs that incorporate advertising into their user interface include the necessary programming built into the software itself. That is, the various parameters relating to the presentation of the advertisement is pre-determined and programmed into the software. These parameters may include such things as where on the screen the advertisement is displayed, the display size, the duration of display, the number of times a particular advertisement is displayed, the conditions under which a particular advertisement is to be displayed, the type of action taken upon a user clicking on the advertisement, and so forth. One problem with these currently available programs is that these parameters can only be changed by replacement of the entire program with an updated, revised version, making it difficult to respond to desired changes in advertising approaches.

To provide demographically-targeted advertising, the advertiser or distributor of the advertising must obtain demographic data on its end users. Perhaps the most common way to acquire demographic data regarding users via the Internet is to request the information using a form written in html (HyperText Markup Language) and provided to the user over the World-Wide Web (WWW) using http (HyperText Transfer Protocol). This is sometimes done as a prerequisite to allowing the user access to information resources or download software from a particular web site. While authentication of demographic information obtained this way is difficult and rarely done, it has been found that end users typically provide accurate demographic data in return for free download access to software. Furthermore, studies have shown that while people are concerned about privacy issues and, in particular, do not wish to provide specific information that identifies them (such as their name, address, or Social Security number), they generally do not mind providing demographic information, nor do they mind monitoring of their computer usage as long as their usage is not associated with any specific information that could be used to identify them.

Various other arrangements have been suggested for obtaining and reporting information about an end user over a computer network such as the Internet. For example, U.S. Pat. No. 5,724,521 to Dedrick discloses an electronic advertising system in which a user profile is created and transferred to a metering server where it is used along with other end user profiles to charge advertiser's according to a consumer scale. The profile data is also used by the metering server to select advertisement titles that are sent to the end user for viewing at the request of the end user. When a user requests an advertisement, the metering server sends the advertisement to the end user, charges the advertiser, and provides the advertiser with profile data on that end user. The system can include client-side software which acquires and compiles information concerning the user's interaction with the advertising or other content provided by the metering server.

U.S. Pat. No. 5,732,218 to Bland et al. discloses a system for gathering data concerning an end-user's access to information resources and reporting the data back to the servers that contain the information resources. Data gathering at the client is accomplished using an applet, plug-in, or other browser extension that acquires the data and then reports that data to those servers accessed by the client, either periodically or in response to a specific request by the servers. In this way, the servers being accessed for their information resources get reported back to them information concerning the end-user's use of that information. Limited demographic information (e.g., time zone, locale, client hardware) can be included in this reporting as well.

One of the disadvantages of prior art systems that acquire data regarding an end-user's computer usage is that they are generally limited to gathering information concerning only certain limited uses of the computer. For example, in Bland et al., the focus of the gathering and use of end-user data is in the user's interaction with web pages, whether over the Internet or otherwise. Similarly, in Dedrick, the compilation of data is directed to interaction between the end-user and the advertising or other content provided by the metering server itself. By limiting the reported data in this manner, it is difficult to develop accurate profiles for the individual users that are useful in targeting the advertising.

U.S. Pat. No. 5,347,632 to Filepp et al. discloses a reception system in which both user demographics and individual system usage information can be used to target advertising. However, this information is used to select which advertisements are to be placed into an advertisement queue from which advertisements are then accessed, apparently in the order in which they were placed in the queue. Thus, this system permits targeting of advertising generally, but does not provide real time targeting of advertising based upon user actions.

Except as may be explicitly indicated otherwise, the following definitions shall apply:

computer—An apparatus having a processing device that is capable of executing instructions.

computer usage information—Data concerning a person's use of a computer, including such things as what programs they run, what information resources they access, what time of day or days of the week they use the computer, and so forth.

data set—A group of data items; for example, links, keywords, or entries in an address book.

display object—Data capable of display by a computer, including graphical images as well as multimedia presentations or other display data that includes audio in addition to visually-perceived data.

graphical image—Visually-perceived data stored in a graphic format (e.g., jpeg, gif, bmp, tiff, pcx, etc.), including electronically-reproduced photographs, graphics, animations, icons, and textual messages.

information resource—A source of information stored on a server or other computer that is accessible to other computers over a network.

keyword—A textual data item used in locating related sources of information.

link—A data item that identifies the location or address of a program or information resource. A URL is a link, as is a path and filename of an information resource.

non-volatile data storage device—A memory device that retains computer-readable data or programming code in the absence of externally-supplied power, including such things as a hard disk or a floppy disk, a compact disk read-only memory (CDROM), digital versatile disk (DVD), magneto-optical disk, and so forth.

program component—A set of instructions stored in a file in computer-readable format, whether as object code or source code, and whether written in a compiled language, in byte code (such as Java™), or in a scripting or other interpreted language.

program module —One or more related program components.

program—One or more related program modules.

reactively—in response to some type of user input, such as a mouse click on a particular user application or on a link to an information resource.

server—A computer on a network that answers requests for information.

software application—A program and associated libraries and other files; for example, a word processing application, a spreadsheet application, or a personal information management application.

SUMMARY OF THE INVENTION

In accordance with one aspect of the present invention there is provided an apparatus for use by a computer to provide a user of the computer with access to information resources via the Internet or otherwise. The apparatus comprises a non-volatile data storage device with first and second program modules stored on the non-volatile storage device. The first program module is operable upon execution to display a graphical user interface comprising a window separated into a number of regions, with a first one of the regions including a number of user-selectable items, at least some of which are each associated with a different data set. The data sets are each representative of a different category of information (e.g., financial, news, sports, etc.) and each of the data sets comprise a number of user-selectable links to different information resources. For example, the data sets can be groups of related URLs, whereby the information resources comprise web pages accessible via the Internet. A second one of the regions comprises an information display region which can display such things as banner advertisements. The second program module is operable upon execution to select informational data to be displayed in the information display region. The first program module is operable in response to selection of a first one of the links to provide the user with access to its associated information resource and to notify the second program module of the selection of that first link. The second program module is operable in response to notifications from the first program module to select the informational data to be displayed from among a larger amount of informational data, and the second program module is further operable to store statistical data regarding the display of the selected informational data. This permits targeting of banner advertisements based upon the type of link (financial, news, sports, etc.) selected by the user.

In accordance with another aspect of the invention, there is provided a computer-readable memory for use by a computer to provide a user of the computer with an automatically-upgradeable software application. The computer readable memory comprises a non-volatile data storage device and a program that is separated into a plurality of program modules that are stored on the non-volatile data storage device. Some or all of the program modules have at least one version identifier associated with them. One of the program modules is operable upon execution to access the stored version identifier(s) and at least one updated version identifier from a server via a global public network such as the Internet. These updated version identifier(s) represent updated program modules accessible from a server via the public network. This program module is further operable to download one or more updated program modules when the stored version identifier and the updated version identifier are different, with the updated program module(s) replacing one or more of the program modules. In this way, software upgrades can be carried out automatically without any user action required. Also, upgrading can be accomplished without having to download and install the entire software package.

In accordance with another aspect of the invention, a method is provided for supplying demographically-targeted advertising to a computer user. The method includes the steps of:

provides a server that is accessible via a computer network such as the Internet, permitting a computer user to access the server via the computer network, acquiring demographic information about the user (which includes information specifically provided by the user in response to a request for the demographic information), providing the user with download access to computer software that, when run on a computer, displays advertising content, records computer usage information concerning the user's utilization of the computer, and periodically requests additional advertising content, transferring a copy of the software to the computer in response to a download request by the user, providing a unique identifier to the computer, with the identifier uniquely identifying information sent over the computer network from the computer to the server, associating the unique identifier with demographic information in a database, selecting advertising content for transfer to the computer in accordance with the demographic information associated with the unique identifier, transferring the advertising content from the server to the computer for display by the program, periodically acquiring the unique identifier and the computer usage information recorded by the software from the computer via the computer network, and associating the computer usage information with the demographic information using the unique identifier.

In accordance with yet another aspect of the invention, there is provided a computer-readable memory for use by a computer to provide a user of the computer with targeted information. The memory comprises a non-volatile data storage device and a program stored thereon. The program is operable upon execution to display a window containing an information display region. The program is also operable to select and display informational data (such as a banner advertisement) in the information display region. The informational data comprises a plurality of display objects with at least some of the display objects each having a data set associated therewith. The data sets each include one or more of the following data items:

a category identifier that indicates a category of information to which the associated display object relates, wherein the program is operable in response to receiving user input relating to one of the categories of information to display in the information display region a display object having an associated category identifier that relates to that one category of information;

a software application identifier that identifies a software application that may be accessible to the user via the computer, wherein the program is operable in response to user selection of the software application to display in the information display region a display object associated with the selected software application.

These identifiers permit real time, reactively-targeted advertising since the program can respond to user interaction with the computer to determine whether the input relates to a particular category of information and, if so, can select advertising related to that category of information.

BRIEF DESCRIPTION OF THE DRAWINGS

A preferred exemplary embodiment of the present invention will hereinafter be described in conjunction with the appended drawings, wherein like designations denote like elements, and:

FIG. 5 is an exemplary view of the graphical user interface (GUI) generated by the client software application of FIG. 4;

FIG. 5a is an exemplary view of a bookmark category window generated by the client software application of FIG. 4;

FIG. 7 depicts the structure of the banner database used by the client software application of FIG. 4;

DESCRIPTION OF THE PREFERRED EMBODIMENTS

Figure 1:
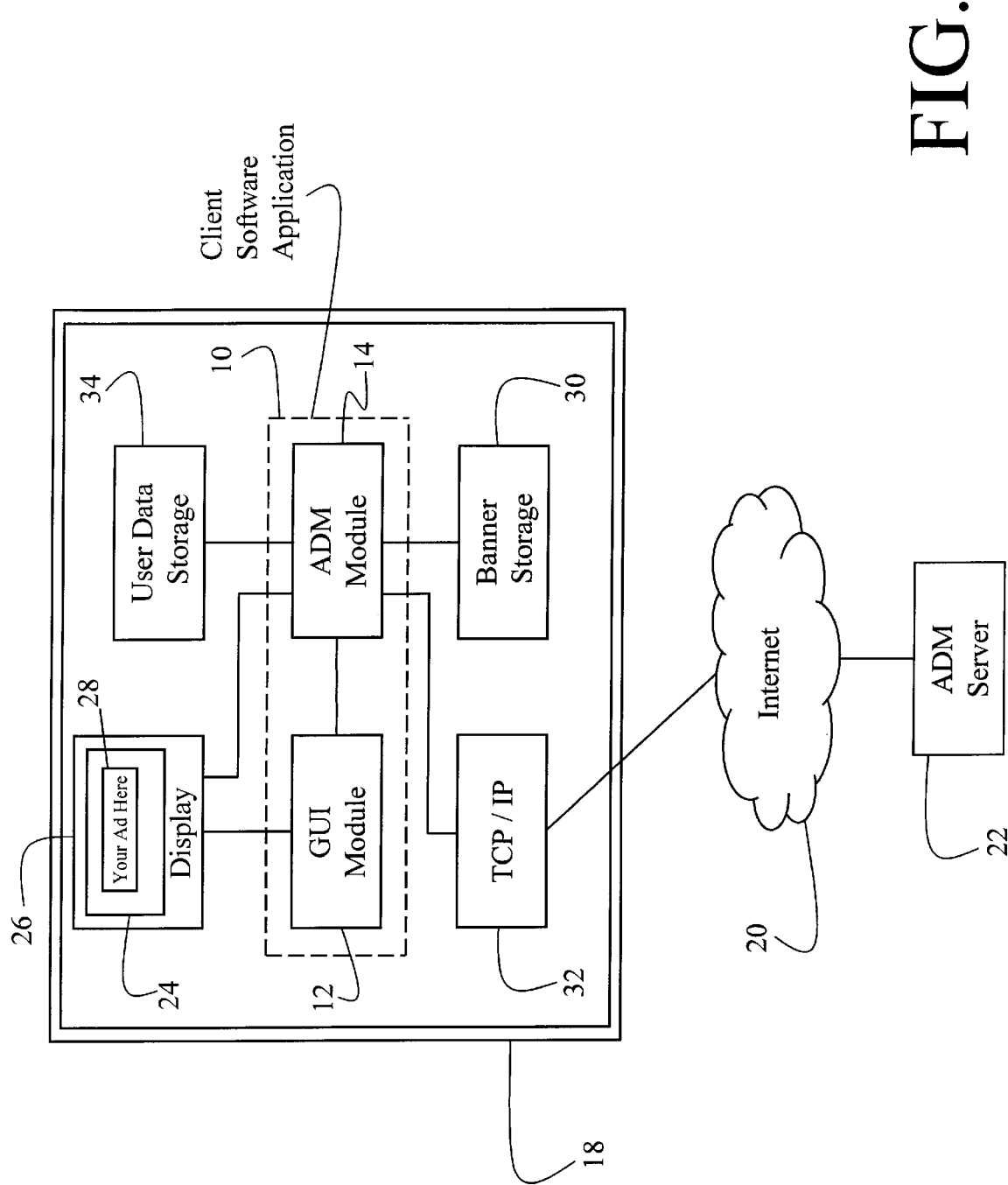
FIG. 1 is block diagram of a first embodiment of the invention depicting a client software application comprising two program modules located on a computer connected to a server by way of the Internet.

Referring first to FIG. 1, there is shown an overview of a client software application 10 comprising a graphical user interface (GUI) program module 12 and an advertising and data management (ADM) program module 14. Working together, these program modules act as a single software application that provides the computer user with a fully integrated interface to the other software applications loaded on the user's computer 18, as well as to information resources located on a private or public network, such as the Internet 20. Client application 10 may also include other executables, support files, and libraries that are used by program modules 12 and 14. In general, GUI module 12 contains the basic programming necessary to provide a user interface to the computer's software applications and operating system (e.g., Windows98 or WindowsNT), while ADM module 14 provides the basic management of the display and refreshing of advertising as well as the acquisition and reporting of computer usage information to an advertising and data management (ADM) server 22 via the Internet 20.

Computer 18 is a conventional personal computer, such as one that utilizes an Intel™ Pentium™ microprocessor. As is common, computer 18 includes RAM, a hard disk drive, a floppy drive, a CD-ROM or DVD drive, a mouse or other serial input device, a keyboard (all not shown), as well as a monitor 26. Computer 18 also includes a network adapter card through which it accesses the Internet. Alternatively, it can include a modem for accessing the Internet via a standard telephone line. As will be discussed below, client software application 10 is initially stored on a computer-readable memory (such as a hard drive) at server 22 and a copy is then downloaded and stored on the hard drive of computer 18 in response to a download request by the user.

As will be discussed in greater detail below in connection with FIGS. 5 and 6, GUI module 12 generates an application window 24 that is displayed on the computer monitor 26. This window is separated into a number of regions, one of which is a banner region 28 for advertisements or other messages processed by ADM module 14. The advertisements displayed in banner region 28 are display objects such as graphical images that are stored on the computer's hard drive or in other non-volatile memory as a file or multiple files which are collectively represented in FIG. 1 as banner storage 30. They are accessed as needed by ADM module 14 and displayed in banner region 28. Upon ADM module 14 determining that new advertising is needed, it accesses the Internet via an existing TCP/IP connection 32 and downloads new banners from ADM server 22. Periodically, computer usage information is sent to ADM server 22 for use in profiling the end user and better targeting future advertising to the end user. This computer usage information is stored on the end user's computer 18 in user data storage 34, which again can be the computer's hard drive or other non-volatile storage.

By separating out the advertising and end-user data management functions and providing them as a separate program, these functions can be changed easily by replacing the ADM module 14 without the necessity of downloading and installing an entire new version of the software. This update capability can be programmed into GUI module 12 (or, possibly, into ADM module 14) so that it periodically checks with server 22 for an updated ADM module 14 and, if found, downloads the new program and installs it as necessary. This can be done automatically without the client software application requiring any user input, if desired.

ADM module 14 can be downloaded as object code, in which case it can be executed as is and can be started by the GUI program 12 each time that program is run. Optionally, ADM module 14 can be written in byte code, such as Java™, or even in a suitable scripting or interpreted language. If desired, the execution engine needed for these latter types of programming can be provided originally as a part of the total software application 10. Alternatively, existing execution engines, such as those found in Java™ and JavaScript™-enabled browsers, can be used to execute ADM module 14 upon call by GUI module 12. Moreover, if written in one of these latter programming languages, GUI module 12 or ADM module 14 can initiate operation of the browser (if not already running) and can direct the browser to ADM server 22 in which case the new version of ADM module 14 can be automatically downloaded and run by the browser.

Figure 2:
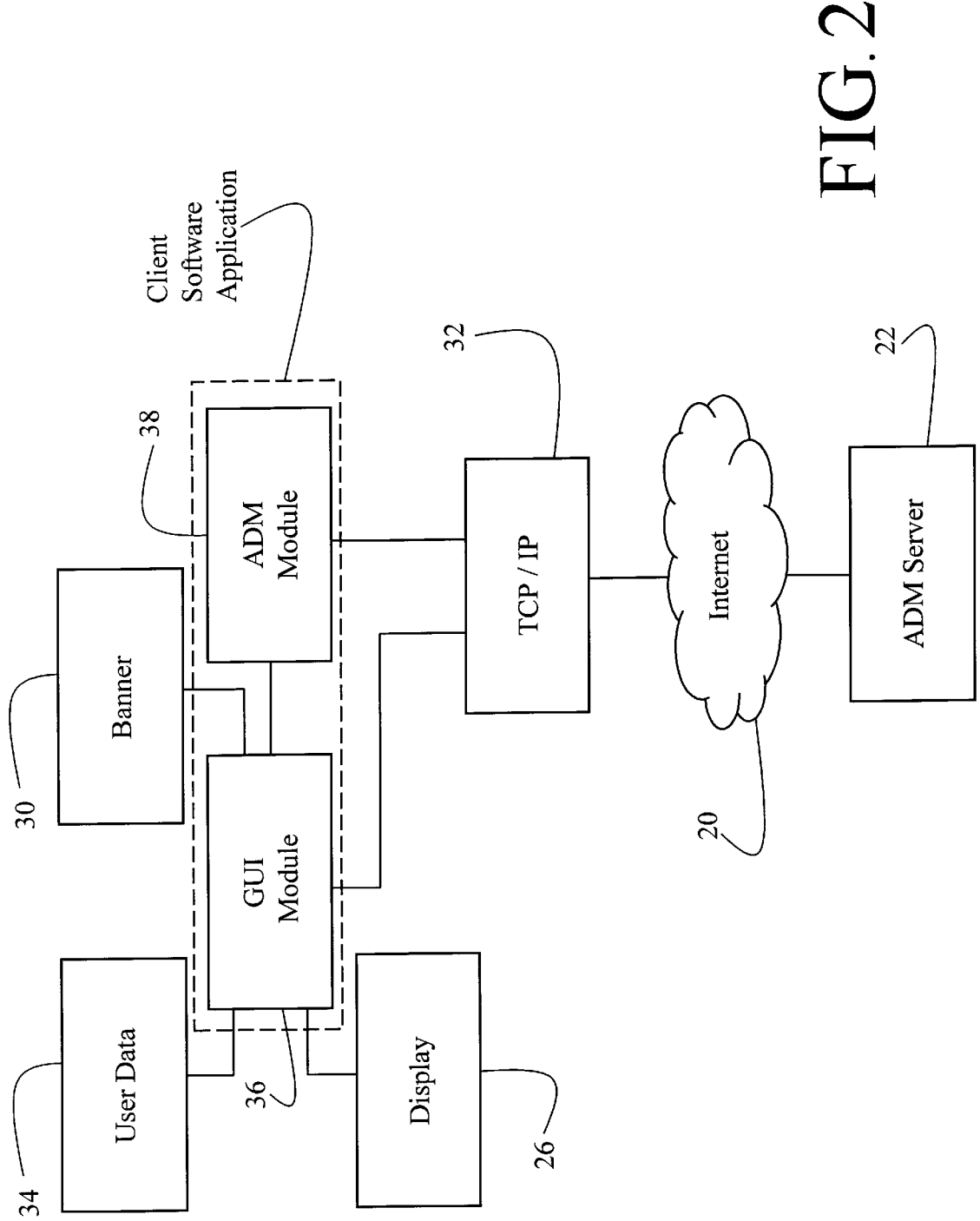
FIG. 2 is a block diagram of second embodiment that is a modified form of the that shown in FIG. 1.

Although ADM module 14 is shown in FIG. 1 as handling storage of the computer usage information and banner advertising, as well as display of the advertising and reporting of the computer usage information, it will be appreciated that most of these functions can be handled by GUI module 12, with ADM module 14 simply providing the basic logic and rules which govern the display and reporting functions. This is shown in FIG. 2. In this embodiment, GUI module 36 still reports events to ADM module 38 which, as in the system of FIG. 1, determines what action is to be taken. However, it is GUI module 36 that actually does the work, including accessing or storing data in banner storage 30 or user data storage 34, reporting computer usage information to ADM server 22, accessing new banner advertising from server 22 and, when available, downloading a new ADM module 38. One advantage of this separation of functions between GUI module 36 and ADM module 38 is that it permits ADM module 38 to be written as a streamlined program module that occupies a minimum amount of storage space so that the basic logic governing advertising processing can be easily and quickly upgraded by downloading a new ADM module 38.

Figure 3:
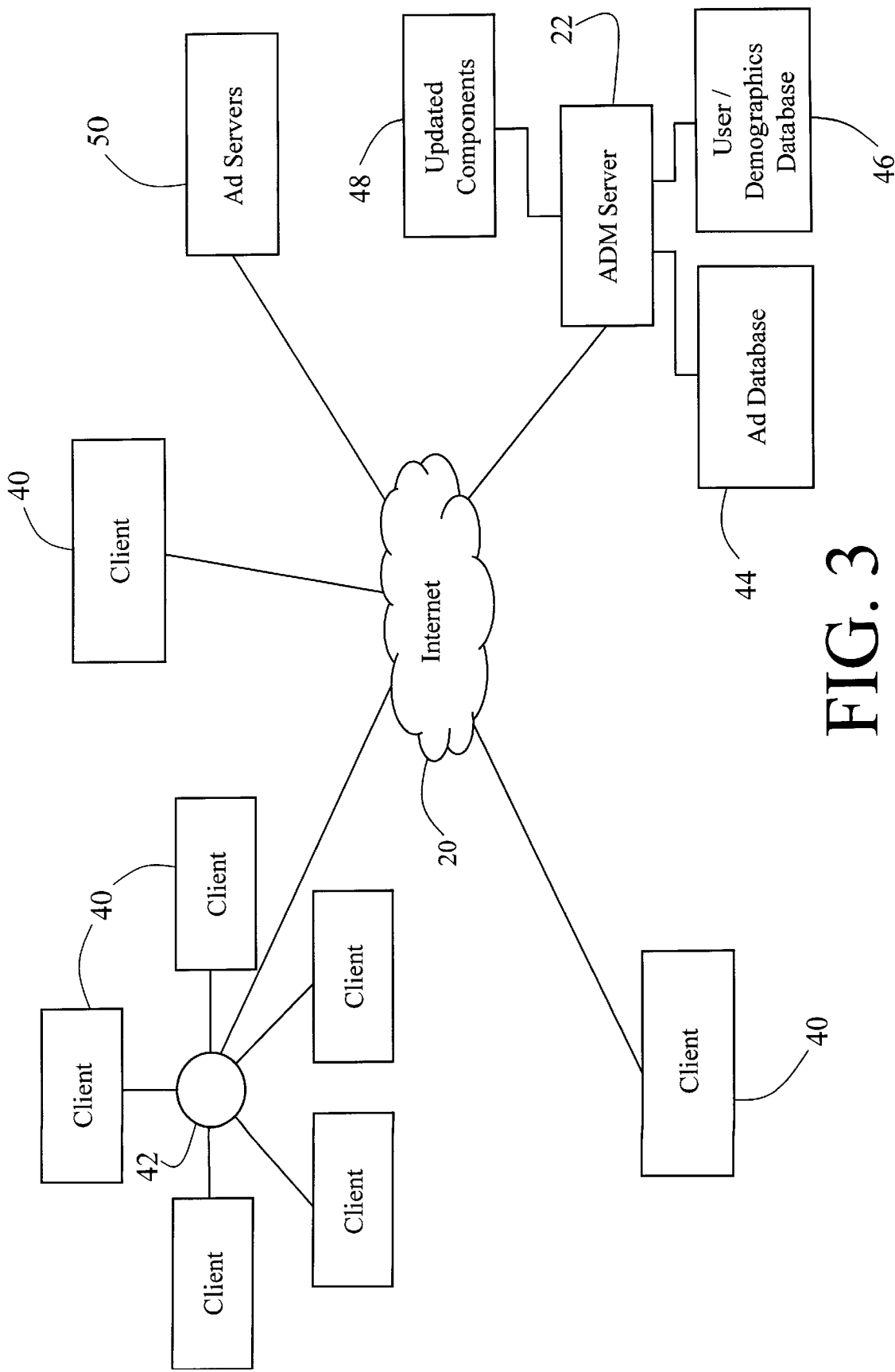
FIG. 3 is a block diagram depicting further details regarding use of the server shown in FIG. 1.

Referring now to FIG. 3, ADM server 22 is accessible via the Internet by any of a number of remotely located client computers 40 on which client software application 10 is installed. This can include client computers that are connected directly to the Internet, as well as computers connected via private or other types of networks, such as a LAN 42. ADM server 22 has associated with it an Advertisement Database 44 and a User/Demographics Database 46. Ad Database 44 stores the banner advertising that is provided to the client computers 40 both initially when client application 10 is installed and thereafter periodically as the advertising needs to be replaced. As will be discussed in greater detail below, each advertisement is assigned to one of three priority levels (general, medium, or high) that are used in reactively targeting the banner advertisements. These assignments of the advertisements are stored along with the advertisements themselves in Ad Database 44. Periodically, new advertising can be added to Ad Database 44. Preferably, this is accomplished via the Internet with the new advertising being obtained from one or more Advertising Servers 50, which may be run by an advertising distribution organization or may simply be computers operated by the individual advertisers themselves.

User Database 46 stores the demographic information used in targeting the advertising downloaded to the individual client computers 40. As will be described below, when a user first accesses client application 10 for the purposes of downloading and installing the software, demographic data is obtained on the user and that information is then used to determine what advertising will be provided to that user. Whenever new advertising is required for a particular user, the relevant information from User Database 46 will be used to determine which advertisements should be downloaded to that user's computer.

In addition to advertising selection and distribution, ADM server 22 also handles the distribution of upgrades to client software application 10. In general, the upgrading process involves communication between ADM server 22 and the client computers 40 to determine what program modules are installed at the client computer and to compare those modules to the latest set 48 maintained at ADM server 22. As will be described in connection with FIGS. 4 and 13, this is preferably accomplished using a "blueprint" that contains an identifier (filename and version number) of each of the program modules used by client software application 10. Once it is determined that one or more program modules need to be updated, they are accessed at ADM server 22 and downloaded to the requesting client computer 40 and installed.

Figure 4:
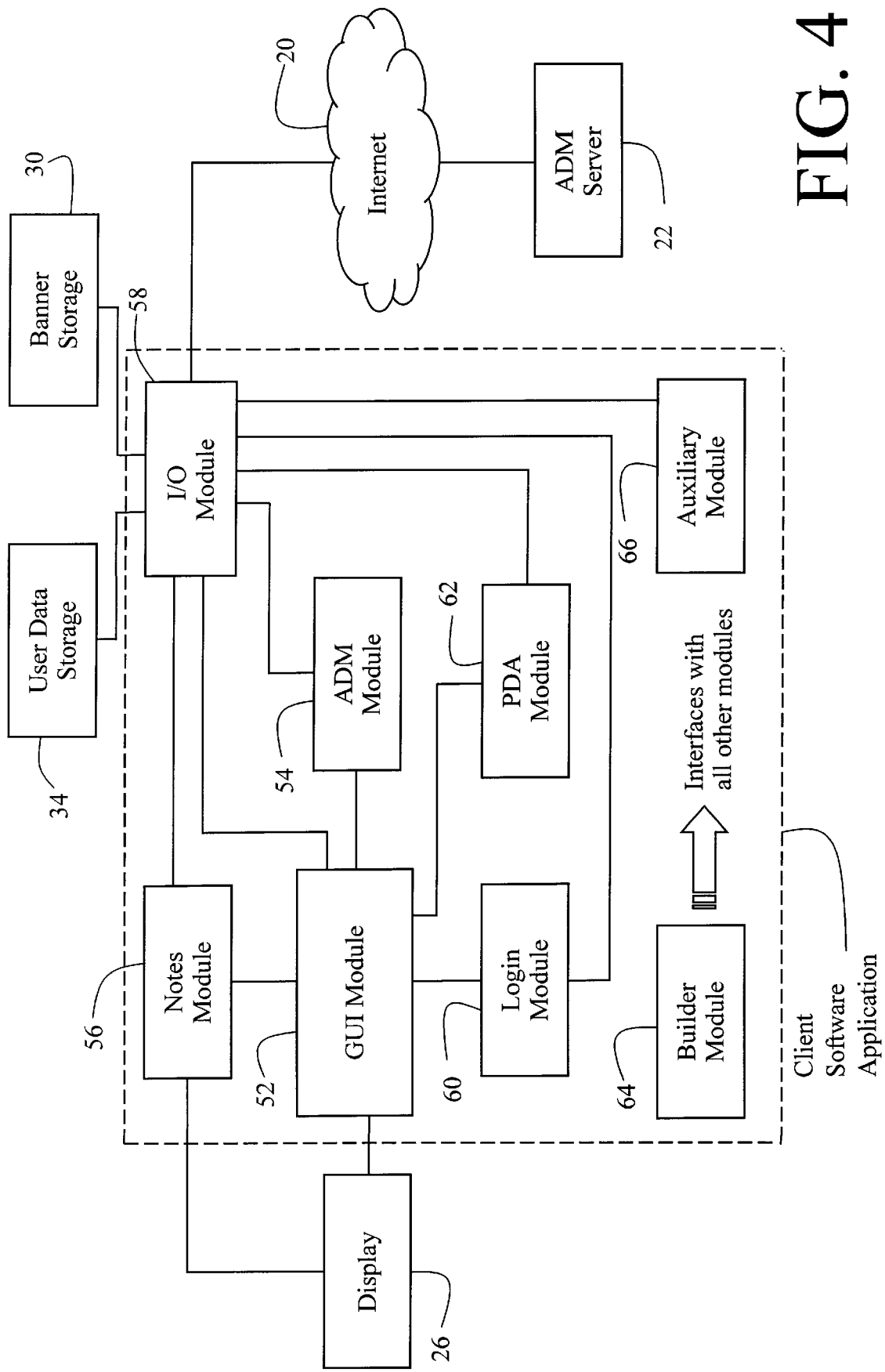
FIG. 4 is a block diagram of a third embodiment of the invention depicting a client software application broken into a number of modules including a builder module responsible for upgrading and addition of any of the program modules.

Turning now to FIG. 4, there is shown a third embodiment of the client software application. In this embodiment, the software application can have the same functionality of the first two embodiments, but is separated into a number of program modules that interact to provide this functionality. In particular, it includes a GUI module 52 and ADM module 54 as in the first two embodiments, but further includes a notes module 56, I/O module 58, login module 60, PDA module 62, builder module 64, and auxiliary module 66. Some of these additional modules, such as the notes module 56, provide added functionality not included in the modules of the FIG. 1 and 2 embodiments. Other of these modules, such as I/O module 58, perform functions that were incorporated into the GUI and/or ADM modules of FIGS. 1 and 2.

Before describing the various modules in detail, reference is made to FIG. 5 which depicts a Windows™ version of the user interface provided by GUI module 52. The user interface comprises application window 24 separated into a number of regions. These regions include a pull-down menu 70, a set (toolbar) of menu icons 72, a URL text field 74, a toolbar containing application icons 76, a banner advertising region 78, and a toolbar containing bookmark category icons 80. While some of these regions provide unique commands and functions that will be described below, the programming used to generate the display in these regions and to enable interactivity with the items displayed within these regions is well within the level of skill in the art. Pull-down menu 70 contains the basic commands available to the user, including launching applications, accessing basic editing commands, changing the display of the user interface, adding and removing application and bookmark category icons, changing window views, and obtaining help. Menu icons 72 contain a number of icons that permit quick access to some of the more common commands contained in menu 70. URL field 74 is a conventional drop-down input box that can be used for entering URLs or path and file names of locally-stored web pages. Once a user has entered a web page location into this field and pressed Enter, GUI module 52 initiates operation of the user's default browser and directs it to access and display the specified web page. Banner advertising region 78 is an information display region in which is displayed graphical images comprising advertising stored locally on the computer. These advertisements are replaced in response to various events including, in particular, user interaction with the computer. Application icons 76 provide single-click initiation of any programs accessible by the user's computer. When client software application 10 is first installed, it initially builds this toolbar using the shortcuts existing on the computer's Windows™ desktop. Thereafter, the user can customize this toolbar, either by dragging icons onto or off of the toolbar, or via a suitable command available under the "Tools" menu item. The client software application can be programmed to automatically add or remove icons from this list when they are added or removed from the Windows™ desktop.

Furthermore, the icons can be automatically organized by the program, either in alphabetical order or otherwise. The bookmark category icons 80 are each associated with a set of links related to a particular category of information, such as finance, news, or sports. By selecting one of the icons, a separate application window containing the related links is opened on the screen. This is shown in FIG. 5*a*. This window also includes a vertically-oriented toolbar containing bookmark category icons 80 so that the user can switch to other categories of links by clicking on the appropriate icon 80. The program is operable to respond to the user's selection of any one of the links by accessing the selected web page using the default browser. As with the application icons 76, bookmark category icons 80 can be added or removed from the toolbar. Furthermore, additional links can be added to the categorized sets of links, whether by conventional drag and drop methods (i.e., dragging onto the bookmark category icons 80) or via menu commands.

To permit user customization, the toolbars containing application icons 76 and bookmark category icons 80 include a slidebar 82 that is initially positioned at the far left of the toolbar, as illustrated, and that can be moved by the user to a location between any two icons on the toolbar. Thereafter, icons to the left of the slidebar cannot be re-organized except by express action of the user. These toolbars also each include left and right arrow buttons 84 that shift the icons in the associated toolbar to the left and right, respectively. These arrow buttons will not affect any icons located to the left of slidebar 82. Each of the toolbars, including the pull-down menu toolbar, includes a collapse button 86 that serves to toggle the display of its associated toolbar. This permits users to collapse the display size of the graphical user interface and to hide those toolbars that the user does not wish to utilize often.

A final region of window 24 is a conventional linked icon 88, which can be used to direct the user's default browser to the home page of the company that provided client software application 10. Also, window 24 can include another icon (not shown) that, when selected, accesses a local floppy or other non-volatile data storage device to retrieve various types of data. For example, a user may want to utilize client application 10 on different computers; for example, a laptop and home or office desktop computer. To prevent the user from having to separately customize each of the two user interfaces, GUI module 52 is operable to store the user's customization settings and preferences on a floppy disk or other non-volatile storage. This disk can then be inserted into the other computer and, once the client application is executed, clicking on the same icon will cause the program to access the disk and to retrieve and apply the user's customizations and preferences to the user interface.

In addition to the toolbar containing bookmark category icons 80, window 24 can also include a "home" or "local" toolbar (not shown) containing the same icons 80, but with the links associated with each category icon 80 being specific to the user's local and regional interests. Thus, for each category of information, this permits the user to keep links to local web sites separate from their other links. In this way the user can, for example, keep links related to local high school sports separately from links for professional sports. When an icon on this "home" toolbar is selected, a window (not shown) separate from that shown in FIG. 5*a* can be opened or, alternatively, the FIG. 5*a* window itself can be used, with a button or other means being provided to allow the user to switch between the icons representing the "home" groups of links and the icons representing the other groups of links.

Figure 6:
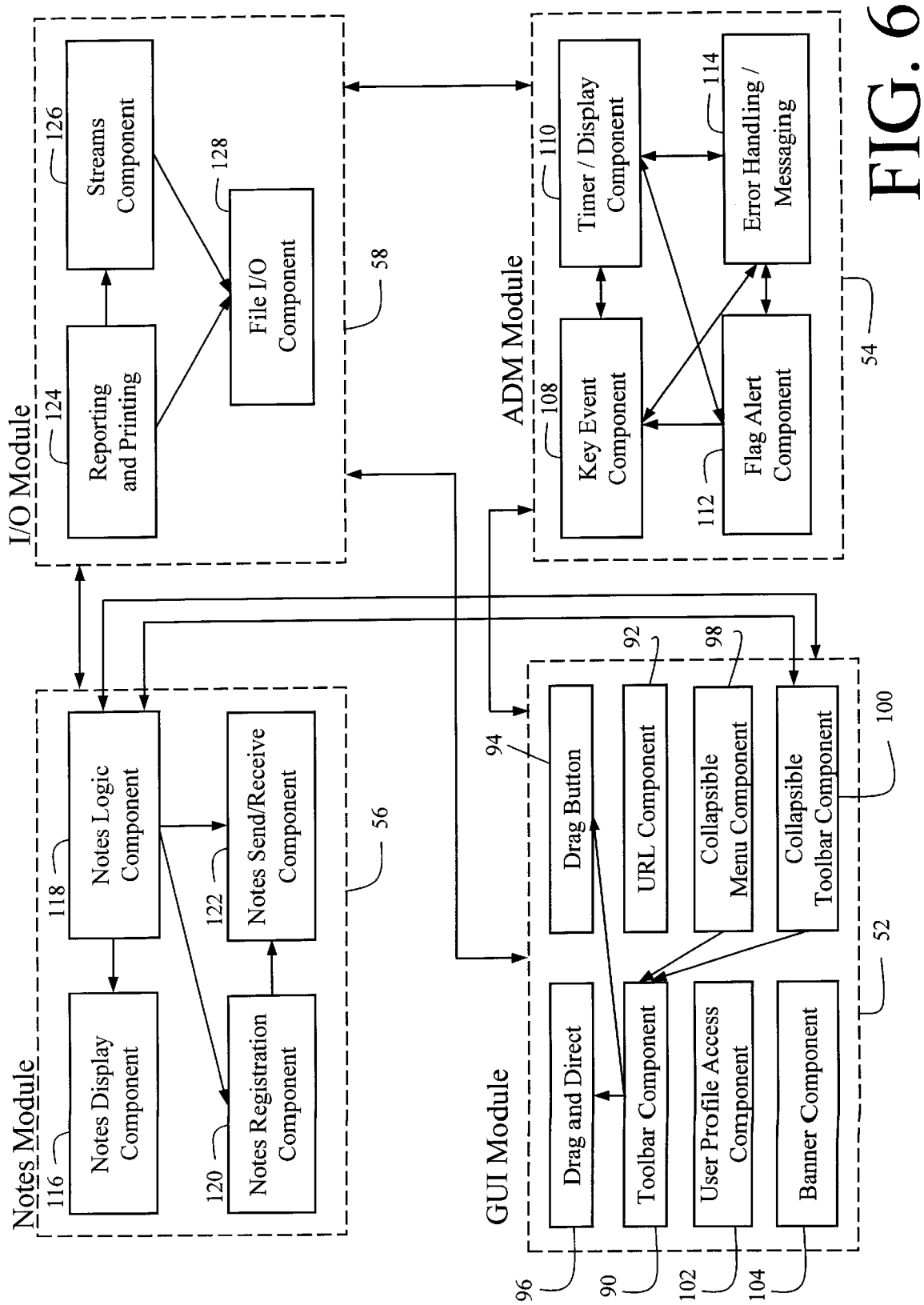
FIG. 6 is block diagram that provides additional detail regarding the client software application depicted in FIG. 4.

Referring now to FIGS. 4–6, the details of the various program components and modules that comprise client software application 10 will now be described. As discussed above, GUI module 52 provides the programming used to display application window 24 including all of its various regions on a computer monitor or display 26. It accesses user customizations and preferences from user data storage 34 via I/O module 58 and interfaces with the other program modules. The user interface provided by GUI module 52 is implemented using a number of program components written in ActiveX™. These components include a toolbar component 90, a URL text field component 92, a drag button component 94, a drag and direct component 96, a collapsible menu component 98, a collapsible toolbar component 100, a user profile access component 102, and an advertising banner component 104.

Toolbar component 90 contains the programming code used to display and manage the applications icons toolbar 76 and the bookmarks categories toolbar 80. This includes the programming that generates the slidebars 82 and left/right buttons 84. This component interfaces with drag button component 94 which contains the programming that generates the various toolbar buttons that are represented by the different icons 76 and 80. Toolbar component 90 also interfaces with drag and direct component 96 which allows the user to customize the toolbars by shifting the icon buttons left or right on the toolbars, as well as drag and drop capabilities to add buttons to or remove buttons from the toolbars. URL field component 92 provides the URL text field 74 that permits direct user input of URL's. Collapsible menu component 98 contains the programming that generates and provides functionality to the pull-down menu 70. Similarly, collapsible toolbar component 100 is used to generate the toolbar containing the menu icons 72. Components 98 and 100 can be derived from the main toolbar component 90 and can function like any other toolbar, except that they are collapsible. User profile access component 102 contains the programming used to access the computer's floppy disk drive (as well as any other source) to read or write the user's customizations and preferences of the user interface. Banner component 104 contains the programming used to access and display an advertising banner specified by ADM module 54. In addition to the drag and drop capabilities discussed above, GUI module 52 can also include the programming necessary to permit dragging of links onto category icons to add them to the associated set of links, as well as dragging of data files (e.g., documents) onto the application icons to initiate execution of the selected application using the selected data file.

ADM module 54 includes a key event component 108, a timer/display component 110, a flag alert component 112, and an error handling component 114. These components are preferably written in ActiveX™ or Java™. User interaction with the computer, whether with the client software application itself or with other applications or the operating system, is monitored by GUI module 52 and reported to key event component 108. As will be understood by those skilled in the art, the detection of user input to other programs and to the operating system itself can be implemented under Windows™ using system hooks. Key event component 108 determines whether the user interaction constitutes a key event; that is, whether a change in displayed banners should be made in response to the user input. If so, it informs timer/display component 110 which contains the programming that determines which banner should be displayed and what computer usage information should be stored for later reporting to ADM server 22. This component also includes a timer that periodically changes the advertisement displayed in banner region 78 in the absence of any user input. The selection of banners will be further described below in connection with FIG. 7.

Once a group of banners have been displayed their allotted number of times, timer/display component 110 notifies flag alert component 112, which sets a new banner flag. This flag is checked periodically and if set, ADM server 22 is accessed to download new banner advertising. If desired, flag alert component 112 can also maintain other flags for use by the system to record the state of various events. For example, it can include a flag that indicates whether the current execution of client software application 10 is the first execution following installation of the software. If so, a special introductory screen could be displayed. Other such uses will become apparent to those skilled in the art. Error handling and messaging component 114 is used to handle error conditions such as, for example, where a user has uninstalled a software application off the computer, but attempts to execute the uninstalled application from an application icon 76 still residing on the applications toolbar. This component can intercept the error message generated by the operating system and take appropriate action such as, for example, informing the user that the application cannot be located and asking whether the user wishes the application icon to be removed from the toolbar.

As mentioned above, client software application 10 monitors the user's interaction with applications other than itself using system hooks. As will be appreciated, this permits the client software application to alter the normal response seen by the user to certain types of interactions with the computer. For example, GUI module 52 preferably monitors user action and, upon detecting that the user has initiated execution of a browser application, whether via an application icon 76 or directly via the computer's operating system itself, GUI module 52 can override the browser's default home page setting and redirect it to another web site. Preferably, the user is queried via a pop-up dialog box prior to redirection to ascertain whether he or she objects to starting the browser at some web site other than the default home page. This can be used as an additional means of exposing the user to advertising while providing the user with some variety in the use of their browser, since they are not limited to always seeing the same site upon startup of the browser. Other such uses of this feature will be apparent to those skilled in the art.

Notes module 56 provides messaging capabilities not only for personal use by the user, but also for use among different users. From the user's standpoint, the notes themselves comprise small pop-up windows containing short messages or reminders. These notes can be associated with certain events. For example, the user could set up a personal note that pops up at the end of the day when the user goes to exit the application. Alternatively, one user could send another user a note related to sports and could set that note to only pop-up when the receiver either accesses the sports bookmark category icon 80 or accesses a sports-related web site. The notes functions (e.g., creating a new note, sending a note, etc.) can be accessed via Tools under the pull-down menu 70. Notes sent between different users connected to the Internet is by way of ADM server 22, which acts as a messaging server, identifying individual users (whether senders or receivers) by way of their unique ID and handling the receipt and distribution of the notes.

Notes module 56 includes a display component 116, a logic component 118, a registration component 120, and a send/receive component 122, all of which can be written in ActiveX™ or Java™. The notes display component 116 contains the programming responsible for the actual display of the pop-up notes on the monitor. The notes logic component 118 is responsible for the logical processing of the notes; for example, determining when or under what conditions a note will be displayed. Registration component 120 handles registration of the client software application with the messaging server process provided by ADM server 22. The send/receive component interfaces with I/O module 58 and is responsible for the actual transmission and reception of notes over the Internet.

I/O Module 58 is used as the interface between the various program modules and banner storage 30, user data storage 34, the Internet 20, and, if connected, a printer (not shown). It includes a reporting and printing component 124, a streams component 126, and a file I/O component 128. These components can all be written in ActiveX™ or Java™. Reporting and printing component 124 contains the programming code used to properly format and direct data to its proper output device (e.g., a printer, log file, etc.). The streams component 126 is used to manage the input and output functions which establish and provide data transmissions between components and objects. It is this component that is used to access the Internet via TCP/IP and can be used with other communications protocols, such as RMI and COM. The file I/O component 128 is used to manipulate stored files, including those used in the banner data storage 30 and user data storage 34.

Login module 60 (FIG. 4) comprises an ActiveX™ or Java™ login component which includes the programming that provides the user login and password validation features. If desired, this module can also include a security component that provides encryption of data transmitted over the Internet. PDA module 62 is an ActiveX™ or Java™ component that can be used to handle importing and exporting of user data between the client software application and the formats needed for use with a personal digital assistant. Also, this module can be used for interfacing the client software application with the user's current personal information management software, such as Outlook™, Lotus Notes™, or Netscape™ mail. The security module can also include an import/export wizard for use by the user in converting between formats.

Builder module 64 interfaces with all of the other modules and contains the programming used to upgrade individual components of the software application from time to time. As with most of the other modules, it can be written in ActiveX™ or Java™. For purposes of upgrading components, each component has associated with it a version identifier that comprises a version name and version number, with the version name simply being the filename of the component or module. Builder module 64 is operable to determine the version name and number for each of the components currently installed on the client computer and to generate from that a current blueprint of the components. Then, the next time an Internet connection is available, the builder component can access ADM server 22 and download from it an upgraded blueprint. The builder module then compares these blueprints to determine whether the client software application installed on the computer is the most current version available. If not, the builder, having both blueprints, can determine specifically which new components it needs. Upgrading of existing components is typically accomplished simply by overwriting the existing files and making the appropriate entries into the Windows™ Registry. At the server side, adding new components to the application simply requires creating the new component and upgrading the existing components to work with the new component, followed by adding the new and revised components to the upgraded blueprint. Then, the next time the server is access by the builder module, it will download the new and revised components.

This upgrading process is implemented automatically by the client software application without requiring any user input or initiation of the process. Also, by modularizing the application in the manner described above, bug fixes and upgrading of features can be achieved without requiring downloading and installation of the entire software application. This is especially useful for distribution of software via the Internet, since software applications typically require anywhere from several Megabytes to tens of Megabytes of disk space and the downloading of such large files can be burdensome.

It may be desirable or necessary from time to time to upgrade the builder module 64 itself so that it can evolve and provide new features not currently anticipated. For this purpose, auxiliary module 66 is provided. Upon builder module 64 determining from the blueprints that it needs to be upgraded itself, it turns over control to auxiliary module 66 and then terminates its execution so that it may be overwritten with the new builder module. Auxiliary module 66 then handles downloading and installation of the new builder module and other components.

As will be appreciated by those skilled in the art, builder module 64 or any of the other modules can have their own set of module commands which they use to perform particular functions. These module commands can be used by other modules to access or implement functions provided by that module. Additional module commands and, thus, additional functionality, can be added simply by creating upgraded modules that include the new module commands and using builder module 64 to upgrade to the new modules in accordance with the procedures described herein.

Referring now to FIG. 7, the details of the selection and use of banner advertising will now be described. In general, banners are displayed either in response to some user action (input) or, in the absence of user input, are displayed periodically at timed intervals. The client software application monitors the user's inputs to the computer and, when possible, targets the banner advertising displayed so that it relates to the what the user is doing.

Preferably, the banner advertisements are stored as graphical images on the client computer's hard drive and are replaced once they have been displayed a certain number of times. As mentioned above, this is accomplished by downloading new banner advertisements from ADM server 22. To avoid running out of banners before new ones can be downloaded from ADM server 22, client software application 10 maintains a plurality of sets of locally stored banners and, at any one time, only displays banners contained in one of the sets. Then, when the banners in that set have all been displayed the allotted number of times, the next set of banners is used with the old set being replaced the next time that server 22 is accessed.

A banner database 130 is stored on the client computer's hard drive along with the image files themselves. This database contains information that is used by timer/display component 110 to determine when the banner should be displayed. In the representation of banner database 130 shown in FIG. 7, each row is a data set that is associated with a different one of the banners. The columns represent individual data items within each data set. The data for each banner includes the filename of the image file, a destination link, one or more associated category identifiers, one or more associated trigger links, one or more associated programs, and a priority level. The destination link is (typically) the URL of the web site to which the default browser will be directed if the user clicks on the banner while it is displayed. The category identifiers specify those categories to which the banner relates and can correspond exactly to the categories used in connection with the bookmark category icons 80 discussed above in connection with FIG. 5. For example, an advertisement for a securities brokerage would be related to finance and possibly business. By associating those category identifiers with the banner in database 130, ADM module 54 will be able to determine the proper time for display of the brokerage advertisement. The associated trigger links specify locations for which the associated banner should be displayed when one of the specified sites are accessed. In the first example given in FIG. 7, if the user were to direct his or her browser to www.lotus.com/123, ADM module 54 would display the banner01.gif image. Where multiple banners are associated with the same link, ADM module 54 determines which of the banners should be selected based upon another criteria such as number of times each banner has previously been displayed. The associated programs column is similar in that execution of one of the specified applications (rather than a visit to a web site) will result in an associated banner being displayed. Finally, the priority level is used to determine the specificity of the targeting of the advertisements.

More specifically, ADM module 54 is programmed to select and display banners at any one of three different levels of processing. The first is the general level, which is the default priority level at which the processing is set when the client software application is first executed. In this mode, only banners having a general priority level will be displayed. The second level is the medium processing level, in which both medium and general banners are displayed, but at a weighting that favors the medium banners. Preferably, when operating in this mode, only one general priority level banner is displayed for every three medium level banners. Similarly, the third level is the high level at which high, medium, and general banners are displayed, with ten high priority level banners being displayed for every three medium level banners and for every one general level banners. The processing level at any one time is determined by the user's actions. In particular, when the user begins execution of an application or selects one of the bookmark category icons 80, the processing level is set to medium so that no high level banners will be used for display. When the user selects a link, the processing level changes to high at which point all banners are candidates for display, with the high priority level banners being given favoritism in the 10-3-1 ratio mentioned above. This ratio can be adjustable by ADM module 54, if desired.

It will be appreciated that other data items for the banners can be included in database 130. For example, each banner can have associated with it a maximum number of permitted displays, with this number being decremented each time that the banner is displayed. This allows different advertisements differing amounts of exposure. Similarly, each banner can have associated with it a weighting or frequency that is used by ADM module 54 to determine how often the banner should be displayed relative to other banners at the same priority level. A "display first" property can also be provided for any particular banner that indicates that it should be displayed before others at its same priority level, with timer/display component 110 providing the programming needed to insure that only one such banner at each priority level has this property set. Apart from the category identifiers, each banner can also have a number of keywords associated with it and ADM module 54 can be programmed to examine the web pages visited by the user to determine if any of those keywords are present, whether they be located in the web page as META TAGs or simply contained in the text of the page. If so, one of the banners associated with the located keyword could be displayed.

As will be apparent to those skilled in the art, client software application 10, acting in conjunction with ADM server 22, provides a two-tiered approach to targeted advertising. The first tier is the initial selection of banners to be downloaded to the user based upon the user's demographic information. The second tier is the reactive targeting of the advertisements based upon user interaction with the computer. Moreover, since client software application 10 communicates with server 22 from time to time and can report back computer usage information as well as information concerning the display of the banners, this information can be associated with the user's demographic information (by way of their unique ID) at the server and then used by the advertisers to help them better understand the consuming public.

As will be appreciated by those skilled in the art, the reactive targeting provided by client software application 10 is handled in real time, rather than simply as a part of building a set of advertisements for later display to the user. This permits the display of advertising that is relevant to what the user is doing at any particular time. Thus, if the user is using the computer to search for information on stocks, then client software application 10 can detect this (whether by recognizing the web site being accessed, the keywords used in the web pages being accessed, the program being executed, or some other aspect of the user's search) and can display an advertisement that is relevant to this topic, whether it be for a stock brokerage, a stock exchange, an investment group, or some other organization. Furthermore, for user computers that enjoy a full time connection to the Internet, the reactive targeting can be used to access a specific advertisement over the Internet, rather than from a pre-stored banner from banner storage 30. This can be accomplished by replacing the local image filenames in the first column of banner database 130 with an Internet address of a specific image file. Alternatively, the user's actions that are used to select an advertisement via banner database 130 can be sent to ADM server 22 or some other advertising server as posted form data, with the server using the data to select and download an appropriate advertisement. This permits real time targeting of advertising while expanding the available pool of advertisements without having to previously download the complete set of advertisements to the user's computer.

Figure 8:
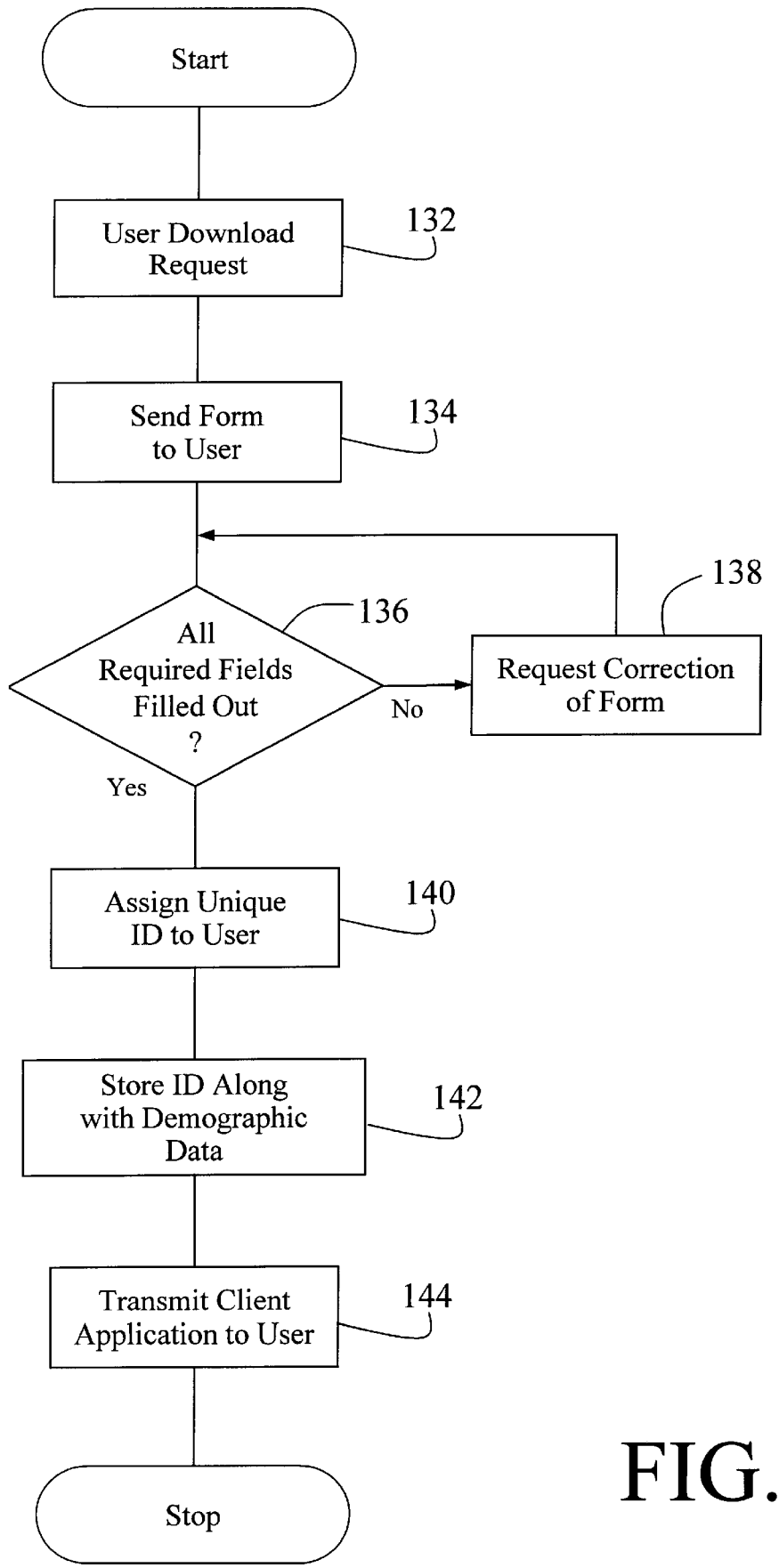
FIG. 8 depicts a method for providing access to the client software application and for obtaining and utilizing demographic information regarding users of the software application.

Referring now to FIG. 8, the process for providing access to the client software application and for obtaining and utilizing demographic information regarding the user will now be described. As will be appreciated, the software download and data gathering process of FIG. 8 can be implemented by a suitable server program residing on ADM server 22. As indicated at blocks 132 and 134, in response to server 22 receiving a download request from a user, the server sends a form to the user and then waits for the completed form to be posted back to the server. The form can include a number of required fields that provide the minimum data needed to generate a proper demographic profile of the user. Once server 22 has received the completed form, a check is made to determine whether all of the required fields have been completed, as indicated at block 136. This check can include a certain amount of validity checking of the data. For example, if the user is required to specify the city and state in which they live, a check could be made to determine whether the city and state reported by the user actually exists. Similarly, a reported area code could be checked to determine its validity. If required information is missing or invalid, flow moves to block 138 where the server resends the form with a request for correction. As is known, this can include an identification of the particular required data that was missing or invalid. Once server 22 receives a correctly completed form, flow moves to block 140 where server 22 assigns a unique ID to the user and then stores that ID along with the received demographic data, as indicated at block 142. As discussed above in connection with FIG. 3, this data is stored in the user/demographics data base 46. Then, an initial set of banner advertisements and links are selected based upon the user's zip code, indicated at block 144. The links are used to provide an initial set of links for each of the bookmark categories represented by icons 80. Thereafter, client software application 10 is downloaded to the user's computer for installation by the user, as indicated at block 146. Preferably, the client software application is packaged as a single, self-extracting ZIP file and includes an installation program that handles installation of the program and all of its components into proper directories, as well as making the necessary entries into the Windows™ Registry.

The user ID that is stored along with the demographic data is used to anonymously identify the user for the purpose of demographically targeting advertising to that user. This can be accomplished by assigning the user ID to the particular copy of the client software application downloaded by the user. Alternatively, the user ID can be included in a cookie placed by server 22 on the user's computer 18 and this cookie can be accessed by server 22 each time computer usage information is sent to server 22 so that the ID can be associated with the computer usage information. In the illustrated embodiment, the user ID is associated with a user login that is required each time the client software application is executed. By having the user login to the application, it can identify which demographics are associated with this particular user. Also, the provision of a user login allows the client software application to be utilized by multiple users, while permitting different demographically targeted advertising to be displayed for each user. This will now be described in connection with FIG. 9.

Figure 9:
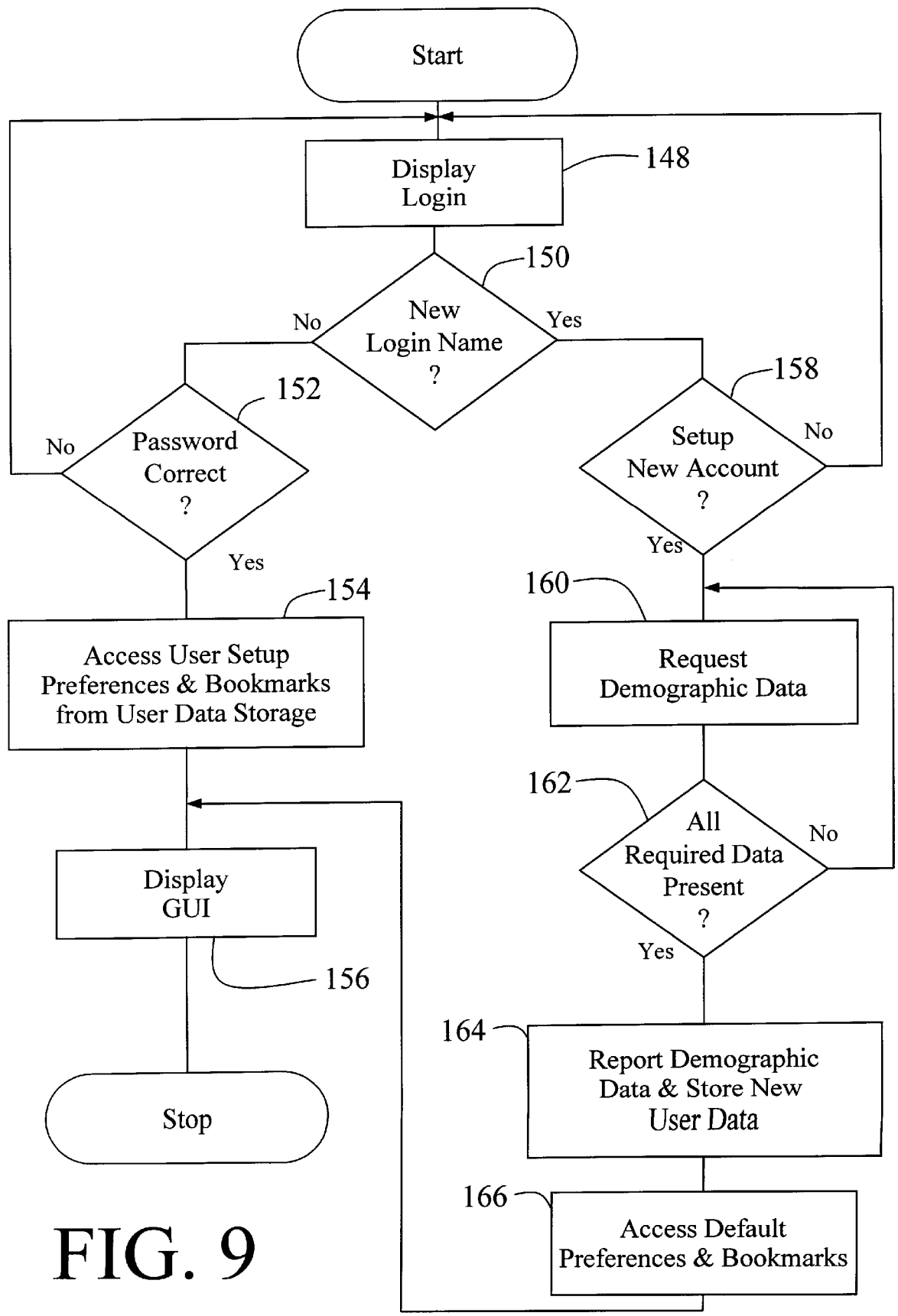
FIG. 9 is a flow chart of the portion of the client software application of FIG. 4 that handles user login as well as acquisition of demographic information for new users of the application.

As shown in FIG. 9, upon execution of the client software application 10, a login and password input box is displayed. This is shown at block 148. Once the user has entered a login name, a check is made at block 150 to determine whether the user name is new. If not, a check is made at block 152 to determine whether the password provided for the recognized login name is correct. If not, flow returns to block 148 where the login box is again displayed. If the password is correct, flow moves to block 154 where the application accesses the user's set of preferences and customizations for the display of the graphical user interface. The application also accesses the banner database and various bookmark categories for that user which, as described above, contains for each category of information a number of links to different information resources. Flow then moves to block 156 where the graphical user interface is displayed along with a first banner. The login names and associated passwords can be stored in the user data storage 34. Similarly, the user preferences, categorized lists of bookmarks, and banner database can be stored in user data storage 34.

If, back at block 150, the login name is determined to be new, the user can be queried as to whether they would like to set up a new account, as indicated at block 158. If not, then flow returns to block 148 where the login screen is again displayed. If a new account is desired, flow moves to block 160 where the application requests various demographic data, which can be the same data requested of the user who originally downloaded the application from server 22. At block 162 a check is made to determine whether all required demographic data was provided. If not, flow returns to block 160 to again request the required data. Once all required information has been provided, flow moves to block 164 where the application reports demographic data back to server 22, receives an assigned ID from the server, and stores the new user data at the client computer in user data storage 34. Flow then moves to block 166 where default preferences and bookmark lists are accessed and assigned to the new user. Flow then moves to block 156 where the graphical user interface is displayed, at which point the user can begin normal use of the application.

If desired, all user-specific information, including logins, password, demographic data, assigned ID, preferences, banner database, and bookmark lists can be stored together as a separate file and treated as a separate user object. This file can be both stored locally on client computer 40 and reported back to server 22. Moreover, this single file can then be used to transfer the user specific data between different computers upon which the application resides. By storing the demographic data at the client itself, demographic targeting of advertising can be accomplished if desired by client software application 10 itself. Furthermore, in situations in which the computer operating system requests a login as a part of boot-up of the computer, or in networked environments where a login at the computer is required for network access, client software application 10 can use the identification of the user provided by these logins rather than requiring a separate login upon execution of the application itself. This allows the client software application to determine who is using the computer without having to request a separate user login.

Figure 10:
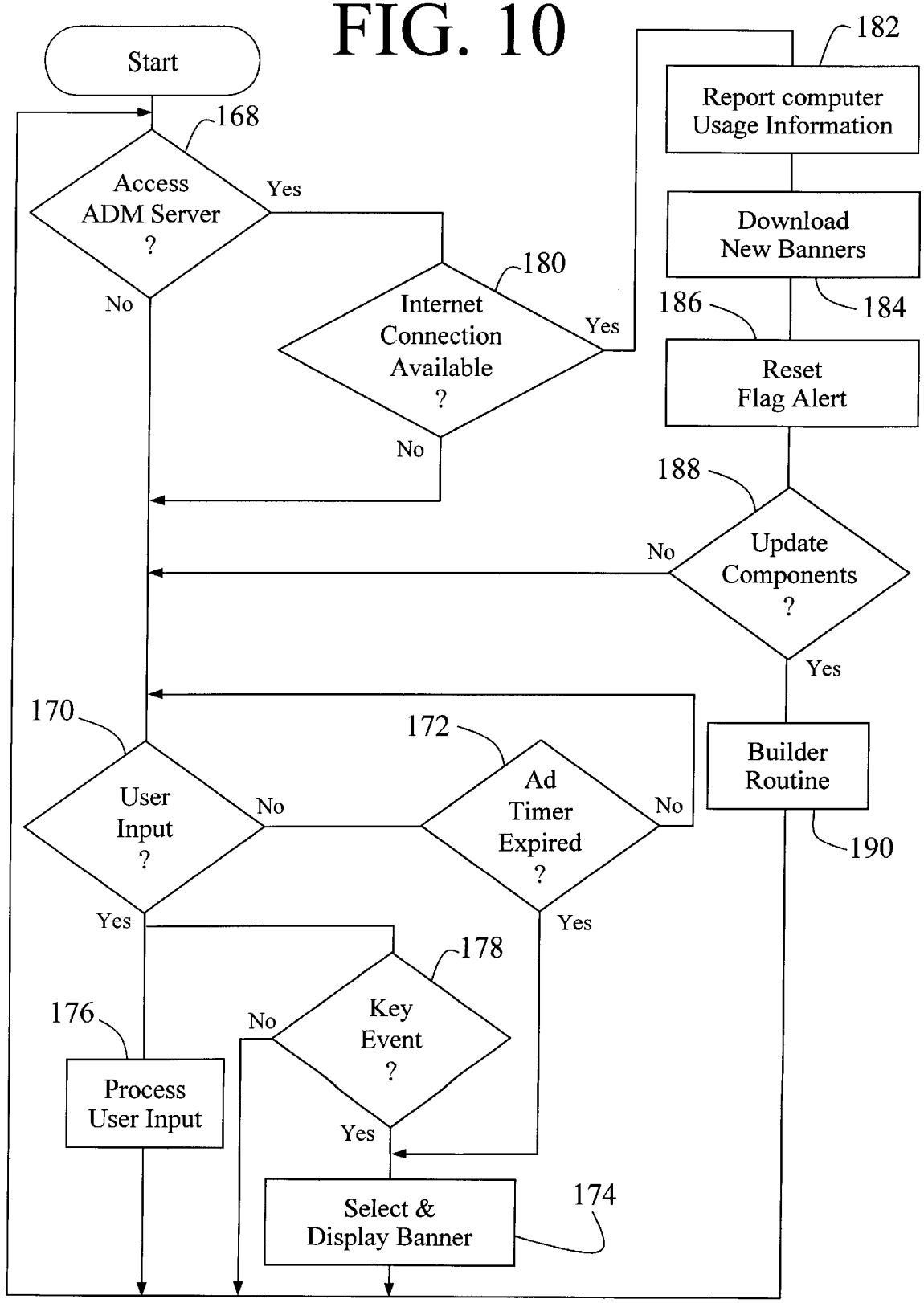
FIG. 10 is a flow chart depicting an overview of the core operation of the client software application of FIG. 4.

Turning now to FIG. 10, there is shown an overview of the core operation of client software application 10. The first step is at block 168 where a check is made to determine whether access to ADM server 22 is needed. Access may be needed to report computer usage information or to download new banner advertising, for example. If no access is currently needed, flow moves to block 170 where a check is made to determine if there is any user input to the computer. If not, flow moves to block 172 where a check is made to determine whether the timer operated by timer/display component 110 has expired. If not, no action is taken and flow returns to block 170 to again check for user interaction with the computer. If the timer has expired, flow moves to block 174 for selection and display of a suitable banner. If, at block 170 user input was detected, flow moves to block 176 where the user input is processed. Flow also moves to block 178 where a check is made to determine whether the user interaction constitutes a key event. If not, flow returns to block 168 and the process repeats. If a key event is detected, then flow moves to block 174 where the key event is processed.

If, at block 168 it was determined that access to ADM server 22 is needed, flow moves to block 180 where a check is made to determine whether an Internet connection is available to the client computer. If no connection is available, the server cannot be accessed at this time and flow therefore moves to block 170. If an Internet connection is available, flow moves to block 182 where the current computer usage information is reported to ADM server 22.

Then, if necessary, the client software application downloads new banners, as indicated at block 184. Flow then moves to block 186 where the new banner flag is reset along with any flags used in reporting of computer usage information. At block 188 a check is then made to determine whether any of the components of software application 10 need to be upgraded. If not, flow moves to block 170 to look for user interaction. If a newer version of one or more components is available, flow moves to block 190 where the builder routine is executed.

Figure 11:
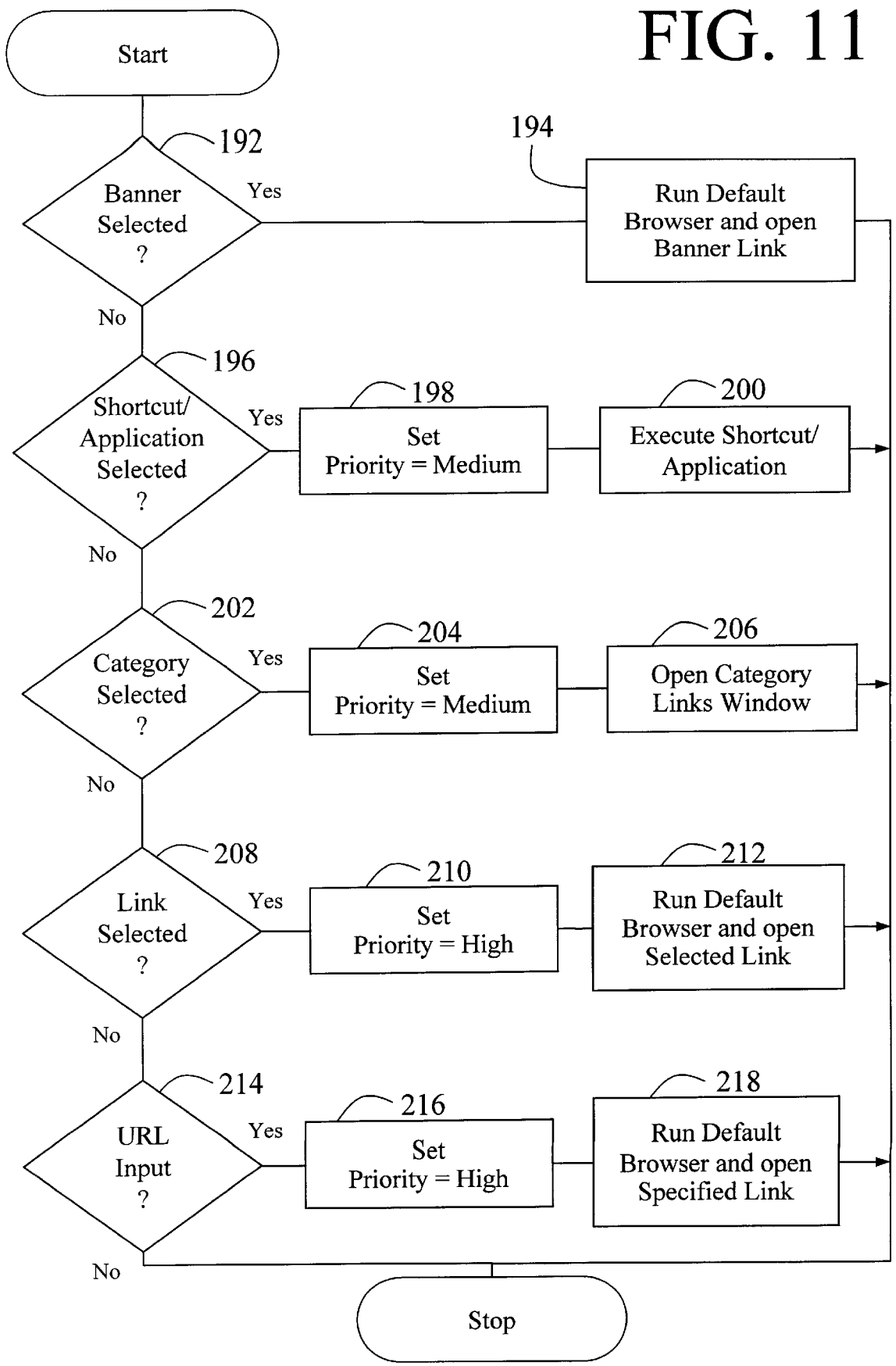
FIG. 11 is a flow chart of the processing of user input that is carried out by the client software application of FIG. 4.

Referring now to FIG. 11, the processing of user input represented by block 176 of FIG. 10 will now be described. This processing begins at block 192 where a check is made to determine whether a user has selected a banner by, for example, a mouse click on the banner itself. If so, flow moves to block 194 where the URL associated with the selected banner is accessed and the user's default browser used to access the site specified by that URL. This process then ends with the flow returning to block 168 of FIG. 10. If at block 192, a banner has not been selected, flow drops down to block 196 where it is determined whether a shortcut or application has been selected. This includes any of the application icons 76 on the application's graphical user interface itself or a shortcut or application selected from the Windows™ desktop. If so, flow moves to block 198 where the priority is set to medium following which flow moves to block 200 where the shortcut or application is executed or otherwise processed in accordance with the normal operation of the operating system. If at block 196 it was determined that no shortcut or application was selected, then flow moves to block 202 where a check is made to determine whether one of the bookmark category icons 80 was selected. If so, flow moves to block 204 where the priority is set to medium, following which flow moves to block 206 where a second application window is opened displaying the links associated with the selected category. If at block 202 no category was selected, then flow moves to block 208 where a check is made to determine whether a specific bookmark or link was selected by the user. If so, flow moves to block 210 where the priority is set to high, following which the default browser is run and the web page specified by the selected link is accessed. If at block 208 no link was selected by the user, flow drops down to block 214 where a check is made to determine whether the user has entered a URL or other web page address into URL text field 74. If so, flow moves to block 216 where the priority is again set to high following which the default browser is opened and the specified link is accessed, as indicated at block 218. If at block 214 no URL was inputted, then no further action is taken by client software application 10.

Figure 12:
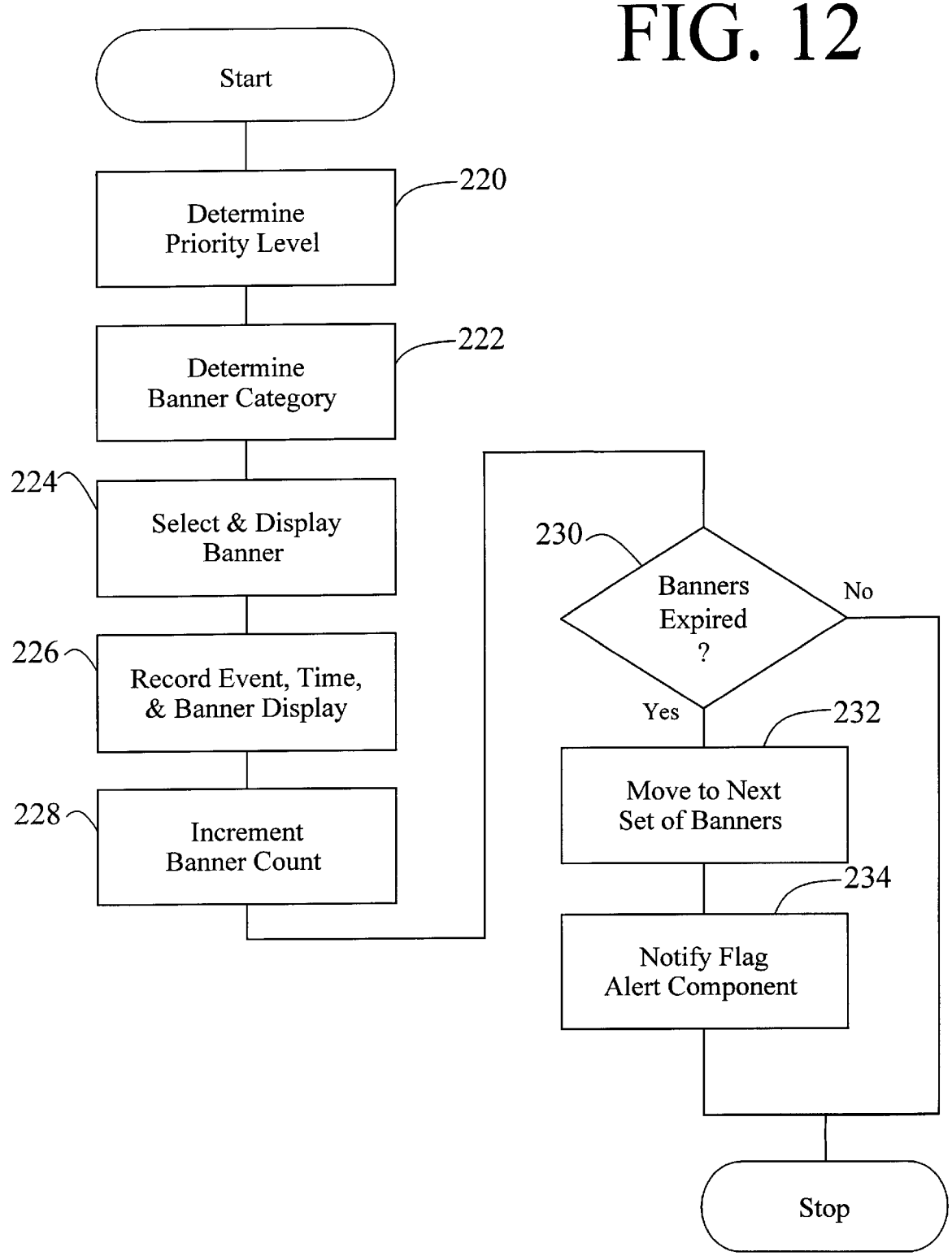
FIG. 12 is a flow chart of the processing of key events that is carried out by the client software application of FIG. 4.

Turning now to FIG. 12, the processing of key events represented by block 174 of FIG. 10 will now be described. As indicated at block 220, the first step is to determine the current priority level which, as discussed in connection with FIG. 11 may have been set from the default general priority level to either medium or high. Flow then moves to block 222 where, in the case of the priority being either medium or high, the selected category of information (finance, news, sports, etc.) is determined so that only those banners associated with that category can be selected as candidates for display. Then, at block 224, using the determined category a particular banner is selected and displayed in the banner region 78. As previously discussed, in addition to an associated category, the banners can also be selected based on associated links and/or programs in the event, for example, that the user accesses a website that is listed in the banner database 130. Flow then moves to block 226 where a record is made of the occurrence of the event, the display of the banner, and the time that the event occurred. This computer usage information can now be reported back to ADM server 22 or a reporting flag can be set so that this information can be reported back the next time that the server is accessible. Flow then moves to block 228 where the banner count associated with the displayed banner is incremented by one. Then, at block 230, a check is made to determine whether the current group of banners has expired, based on their banner counts. If not, the key event processing is finished and flow then returns to block 168 of FIG. 10. If the banners have expired, then flow moves to block 232 where the next available set of locally stored banners is utilized for display purposes and the flag alert component 112 is notified so that it can set the new banner flag, as indicated at block 234. Processing then returns to block 168 of FIG. 10.

Figure 13:
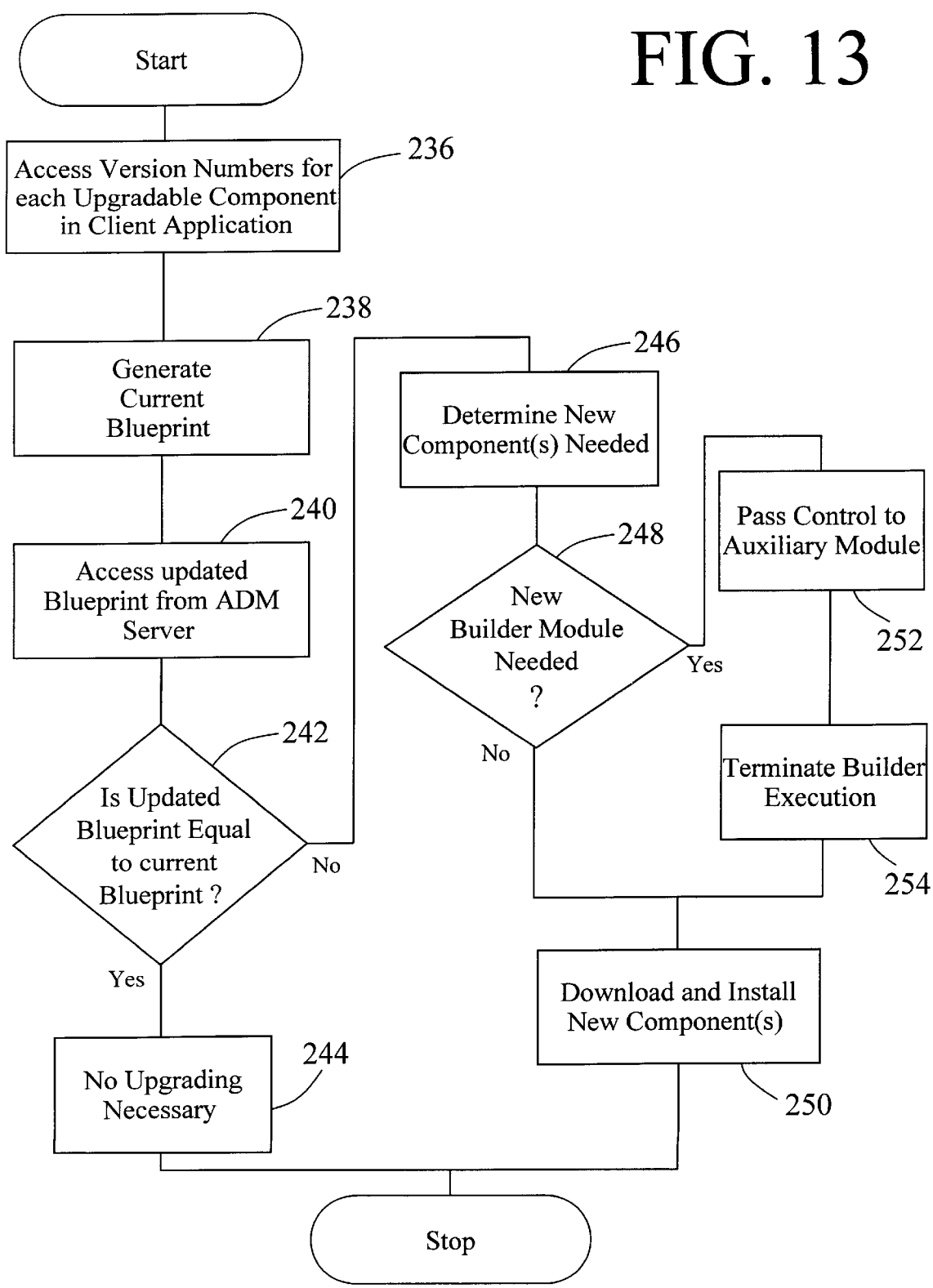
FIG. 13 is a flow chart of the process used by the builder module of FIG. 4 to upgrade different program modules or components used in the client software application.

Referring now to FIG. 13, a first implementation of the builder routine 190 of FIG. 10 will now be described. The process begins at block 236 where the builder component 64 accesses version numbers for each component in the client software application. Flow then moves to block 238 where, using this information, builder component 64 generates a current blueprint. Then, at block 240, the builder component accesses an updated blueprint from ADM server 22. At block 242, a check is made to determine whether the updated blueprint is the same as the current blueprint. If so, the client computer has the upgraded version and no upgrading is necessary, as indicated at block 244. Flow then returns to block 168 of FIG. 10. If, at block 242, the updated blueprint is different from the current blueprint, flow moves to block 246 where the builder module determines which components are new or need upgrading. Flow then moves to block 248 where a check is made to determine whether the builder module itself needs to be upgraded. If not, flow moves to block 250 where the new or upgraded components are downloaded from server 22 and installed. If an upgraded builder module is needed, then flow moves from block 248 to block 252 where control is passed from the builder module to auxiliary module 66, following which flow moves to block 254 where execution of the builder module is terminated so that it may be overwritten with the new builder module. Flow then continues to block 250 where the builder module and other upgraded components are downloaded and installed under control of auxiliary module 66. Flow then returns to block 168 of FIG. 10.

Figure 14:
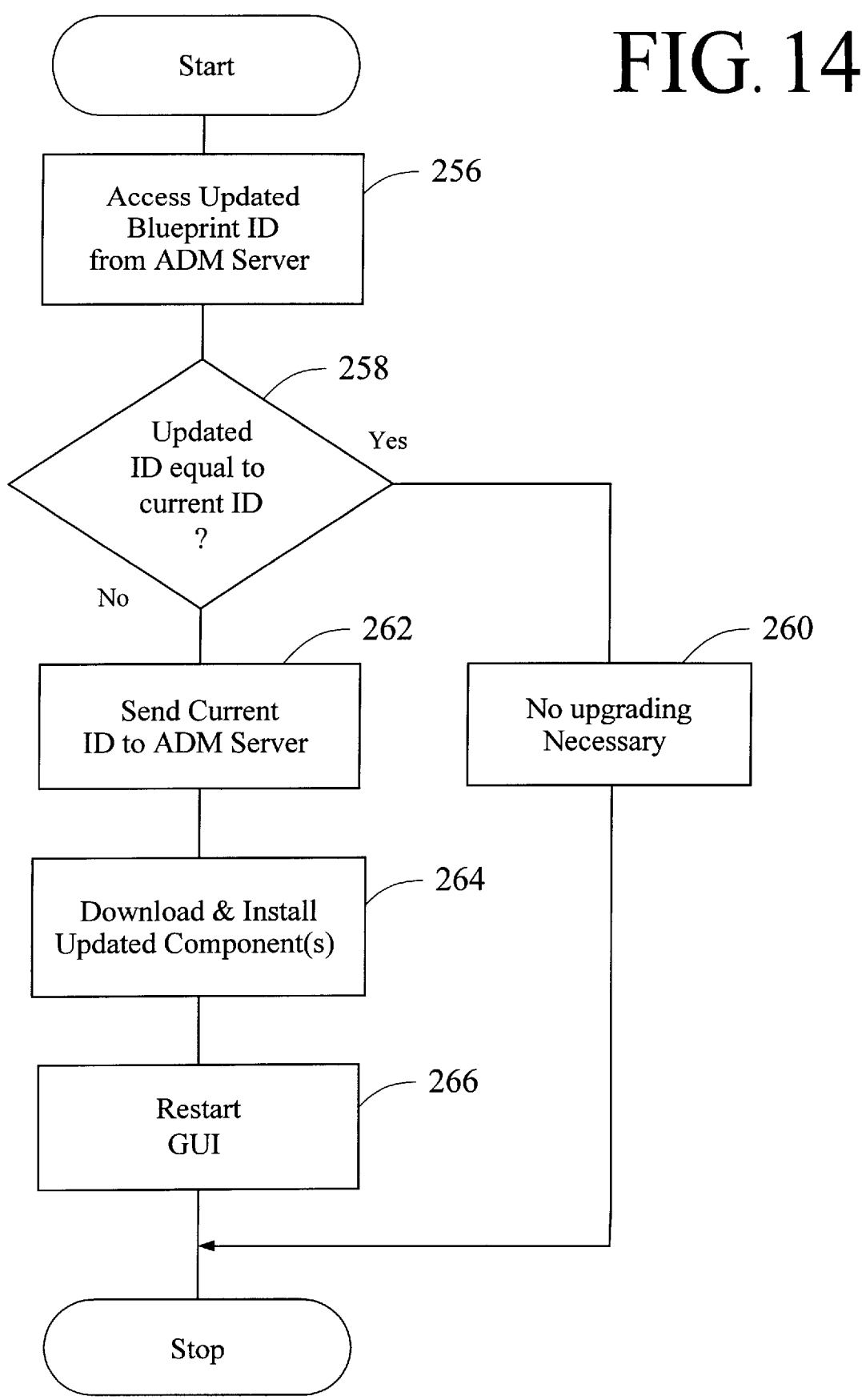
FIG. 14 is a flow chart of a alternative process that can be used by the builder module of FIG. 4 to upgrade program modules or components used in the client software application.

Referring now to FIG. 14, another embodiment of builder routine 190 of FIG. 10 will now be described. In this embodiment, the builder module does not determine the current names and version numbers of all the modules that make up client software application 10, but rather uses a version ID associated with the application to determine whether upgrading of any of the components is necessary. The process starts at block 256 where the builder module accesses an updated blueprint ID from ADM server 22. Then, at block 258, a check is made to determine whether the updated ID is the same as the current version ID. If so, then no upgrading of components is necessary as indicated at block 260 and flow returns to block 168 of FIG. 10. If the ID's are not the same, flow moves to block 262 where the builder module sends the current version ID back to ADM server 22. This current ID is used by ADM server 22 to determine which components need to be downloaded and installed at the client computer so that it has the most recent version. Then, at block 264, the builder module downloads and installs the updated components, following which the process returns to block 168 of FIG. 10. As with the process of FIG. 13, auxiliary module 66 can be used in the event of upgrading of builder module 64 itself. As will be appreciated by those skilled in the art, once the new components have been downloaded and installed, whether by the process of FIG. 13 or FIG. 14, restarting of the computer may be necessary.

It will thus be apparent that there has been provided in accordance with the present invention a method and apparatus for providing an automatically upgradeable graphical user interface with targeted advertising which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, although the advertising features described herein have been disclosed in connection with client software application 10, it will be appreciated that these features can be incorporated into any of a number of other types of software applications and can even be incorporated into the operating system's user interface itself. Other features of client software application 10 can be incorporated into and made an integral part of other software applications and operating systems. Also, rather than downloading the client software application via the Internet or some other network, it could be installed on the user's computer from a CDROM or DVD, with the new user login process of FIG. 9 being used to acquire demographic data on all users of the software. All such variations and modifications are intended to come within the scope of the appended claims.

I claim:

1. An apparatus for use by a computer to provide a user of the computer with access to information resources via a browser, the apparatus comprising:
   a non-volatile data storage device;
   a first program module stored on said non-volatile data storage device in a computer-readable format;
   said first program module being operable upon execution to display a graphical user interface comprising a window separated into a number of regions;
   a first one of said regions including a number of user-selectable items, at least some of which are each associated with a different data set, said data sets each representative of a different category of information and each of said data sets comprising a number of user-selectable links to different information resources;
   a second one of said regions comprising an information display region,
   a second program module operable upon execution to select informational data to be displayed in said information display region;
   wherein said first program module is operable in response to selection of a first one of said links to activate a separate browser application and retrieve the associated information resource using the browser application, said first program module further being operable in response to selection of the first link to notify said second program module of the selection of said first link, whereby said informational data is displayed in said second region of the graphical user interface of said first program module independently of the display of the information resource by said browser application; and
   wherein said second program module is operable in response to notifications from said first program module to select the informational data to be displayed from among a larger amount of said informational data, said second program module further being operable to store statistical data regarding the display of said selected informational data.

2. An apparatus as defined in claim 1, wherein said informational data is selected by said second program module in accordance with the category of information associated with the one of said data sets that contains said first link.

3. An apparatus as defined in claim 1, wherein said second program module is stored in computer-readable format on said non-volatile data storage device and is stored as one or more files that are separate from said first program module, whereby said apparatus comprises a computer-readable memory.

4. An apparatus as defined in claim 1, wherein, when said second program module is stored on a server accessible by the computer over a computer network, said first program module is operable to access and download said second program module to said non-volatile data storage device via the network.

5. An apparatus as defined in claim 4, further comprising a third program module stored on said non-volatile data storage device, said third program module being operable to automatically request upgrade information from the server and to cause downloading and implementation of an upgraded version of at least one of said first and second modules.

6. An apparatus as defined in claim 1, wherein said information display region comprises a banner region and said informational data comprises one of a plurality of advertisements accessible to said second program.

7. An apparatus as defined in claim 6, wherein said second program is operable to select said one of said advertisements from among a first subset of said plurality of advertisements and, in response to each of the advertisements in said first subset having been displayed a selected number of times, to select said one of said advertisements from among a second subset of said plurality of advertisements.

8. An apparatus as defined in claim 7, wherein said second program is operable in response to each of the advertisements in said first subset having been displayed said selected number of times to request a new first subset of advertisements from a server and, in response to receipt of said new first subset, to replace the advertisements in said first subset with the advertisements in said new first subset.

9. An apparatus as defined in claim 6, wherein said second program is operable to select said one of said advertisements from among a plurality of said advertisements in accordance with the category of information associated with said first link.

10. An apparatus as defined in claim 6, wherein said second programs is operable to select said one of said advertisements in accordance with one or more keywords contained in the information obtained from the information resource accessed using said first link.

11. A computer-readable memory for use by a computer to provide a user of the computer with an integrated graphical interface to a plurality of computer resources, the computer-readable memory comprising:
   a non-volatile data storage device;
   a program stored on said non-volatile data storage device in a computer-readable format;
   said program being operable upon execution to display a graphical user interface comprising an application window separated into a number of regions,
   a first one of said regions including a number of graphical objects, at least some of which are each representative of a different computer application and are selectable by the user via an input device, wherein said program is operable upon selection of one of said graphical objects to initiate execution of the computer application associated therewith;

a second one of said regions including a number of menu items selectable by the user, each of said menu items having a function associated therewith;

a third one of said regions including a plurality of user-selectable link category buttons each associated with a different data set, said data sets each comprising a number of links to different information resources, wherein said program is operable in response to selection of one of said link category buttons to display the links from the data set associated with said one of said link category buttons, with said program further being operable in response to selection of one of the displayed links to provide the user with access to its associated information resource via a browser application;

a fourth one of said regions including a user-input text field, wherein said program is operable to access one or more computer files specified by the user via text inputted into said text field;

a fifth one of said regions comprising a banner region, wherein said program is operable to access banner data and display said banner data in said banner region; and said window including a display object that is selectable by the user via the input device, wherein said program is operable in response to selection of the display object to access information stored on a data storage device located in a disk drive within the computer.

12. A computer-readable memory as defined in claim 11, wherein said application window includes a sixth one of said regions that includes a number of user-selectable graphical icons, each of which is associated with one of said menu items, wherein said program is operable in response to selection of one of said graphical icons to carry out the menu item associated with the selected graphical icon.

13. A computer-readable memory as defined in claim 11, wherein each of said data sets comprise at least one link to at least one information resource.

14. A computer-readable memory as defined in claim 11, wherein said program is operable in response to selection of one of said link category buttons to display a second window containing the links from the data set associated with said one of said link category buttons.

15. A computer-readable memory as defined in claim 14, wherein said second window can be positioned by the user independently of the position of said application window.

16. A computer-readable memory for use by a computer to provide a user of the computer with targeted information, comprising:

a non-volatile data storage device;

a program stored on said non-volatile data storage device in computer-readable format, said program being operable upon execution to display a window containing an information display region;

wherein said program is operable to select and display informational data in said information display region, said informational data comprising a plurality of locally-stored display objects with at least some of said display objects each having a locally-stored data set associated therewith, said data sets each including one or more of the following data items:

a category identifier that indicates a category of information to which the associated display object relates, wherein said program is operable in response to a user action relating to one of said categories of information to display in said information display region a display object having an associated category identifier that relates to that one category of information;

a software application identifier that identifies a software application that may be accessible to the user via the computer, wherein said program is operable in response to user selection of the software application to display in said information display region a display object associated with the selected software application;

whereby said program can present the user with display objects that are selected based on user action without requiring concurrent access to any other computer.

17. A computer-readable memory as defined in claim 16, wherein said category identifier comprises at least one keyword and wherein said program is operable in response to user access to an information resource to determine if said accessed information resource contains said keyword and, if so, said program is operable to display in said information display region a display object associated with said keyword.

18. A computer-readable memory as defined in claim 16, wherein said program is operable in response to user selection of an associated group of links that are related to one of said categories of information to display in said information display region a display object associated with that one category of information.

19. A computer-readable memory as defined in claim 18, wherein said program is operable to provide a user interface comprising a number of user-selectable items, each of which represents a different group of associated links and each of which is associated with one of said categories of information, wherein said program is operable in response to user selection of one of said user-selectable items to display in said information display region a display object associated with the category of information to which that one selected item relates.

20. A computer-readable memory as defined in claim 16, wherein one or more of said data sets include a destination identifier that provides a link to an information resource, wherein said program is operable in response to user selection of a display one of said display objects to cause the computer to access the information resource associated with said selected display object.

21. A computer-readable memory as defined in claim 16, wherein one or more of said data sets include at least one trigger link, wherein said program is operable in response to user access to an information resource identified by said trigger link to display in said information display region the display object associated with said trigger link.

22. A computer-readable memory as defined in claim 16, wherein said display object comprises a graphical image.

* * * * *